(12) United States Patent
Kondou et al.

(10) Patent No.: US 8,967,884 B2
(45) Date of Patent: Mar. 3, 2015

(54) OPTICAL TRANSCEIVER

(75) Inventors: Takashi Kondou, Yokohama (JP);
Hiromi Kurashima, Yokohama (JP);
Hiroyasu Oomori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 529 days.

(21) Appl. No.: 13/310,391

(22) Filed: Dec. 2, 2011

(65) Prior Publication Data
US 2012/0148201 A1 Jun. 14, 2012

(30) Foreign Application Priority Data

Dec. 14, 2010 (JP) .................................. 2010-277967
Dec. 20, 2010 (JP) .................................. 2010-282722
Jun. 8, 2011 (JP) .................................. 2011-128634

(51) Int. Cl.
*G02B 6/36* (2006.01)
*G02B 6/42* (2006.01)

(52) U.S. Cl.
CPC ............ *G02B 6/4257* (2013.01); *G02B 6/4245* (2013.01); *G02B 6/4246* (2013.01); *G02B 6/4256* (2013.01); *G02B 6/428* (2013.01)
USPC .......................................................... 385/92

(58) Field of Classification Search
None
See application file for complete search history.

(56) References Cited

U.S. PATENT DOCUMENTS

| 6,556,446 | B1* | 4/2003 | Hwang ........................ 361/728 |
| 7,003,230 | B2* | 2/2006 | Branch et al. ................. 398/135 |
| 7,125,261 | B2* | 10/2006 | Yoshikawa et al. .......... 439/76.1 |
| 7,153,043 | B1 | 12/2006 | Zhang et al. |
| 7,406,230 | B2* | 7/2008 | Yoshikawa ...................... 385/52 |
| 7,416,353 | B2* | 8/2008 | Yoshikawa et al. ............. 385/92 |
| 8,356,728 | B2* | 1/2013 | Moore et al. ................... 220/811 |
| 8,463,098 | B2* | 6/2013 | Khadar ......................... 385/134 |
| 8,469,608 | B2* | 6/2013 | Kurashima ...................... 385/92 |
| 8,616,788 | B2* | 12/2013 | Sone et al. ....................... 385/95 |
| 2002/0110336 | A1* | 8/2002 | Dair et al. ........................ 385/92 |
| 2011/0206328 | A1* | 8/2011 | Wang ............................... 385/94 |
| 2012/0315051 | A1* | 12/2012 | Oomori et al. ................ 398/135 |

FOREIGN PATENT DOCUMENTS

| JP | S57-108386 U | 7/1982 |
| JP | 2004-103743 A | 4/2004 |
| JP | 2006-108684 A | 4/2006 |
| JP | 2010-129667 A | 6/2010 |

OTHER PUBLICATIONS

Japanese Office Action of the corresponding Japanese Patent Application No. 2010-277967, dated Jul. 22, 2014.
Chinese Office Action of the corresponding Chinese Patent Application No. 201110418416.1, dated Sep. 23, 2014.

* cited by examiner

*Primary Examiner* — Sung Pak
(74) *Attorney, Agent, or Firm* — Global IP Counselors, LLP

(57) ABSTRACT

An optical transceiver with two circuit boards is disclosed. The optical transceiver includes two OSAs, two circuit boards, and a holder put between two circuit boards. The circuit boards are assembled with the holder made of resin by the snap-in, and this intermediate product is set within the housing of the transceiver. The cover of the transceiver is also assembled by the snap-in without using screws and so on.

18 Claims, 21 Drawing Sheets

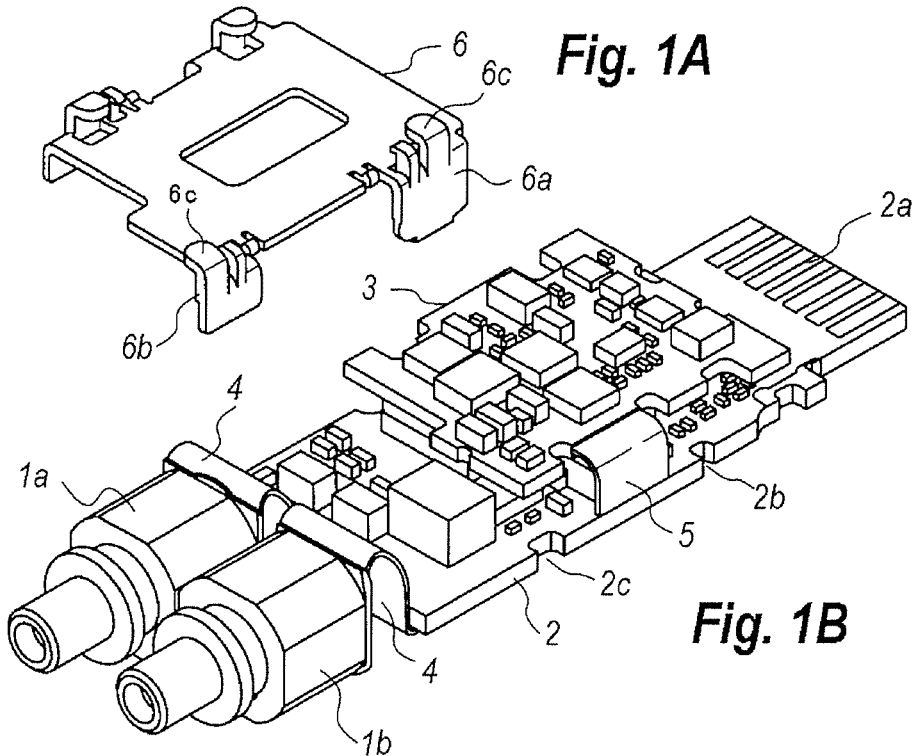
Fig. 1A
Fig. 1B
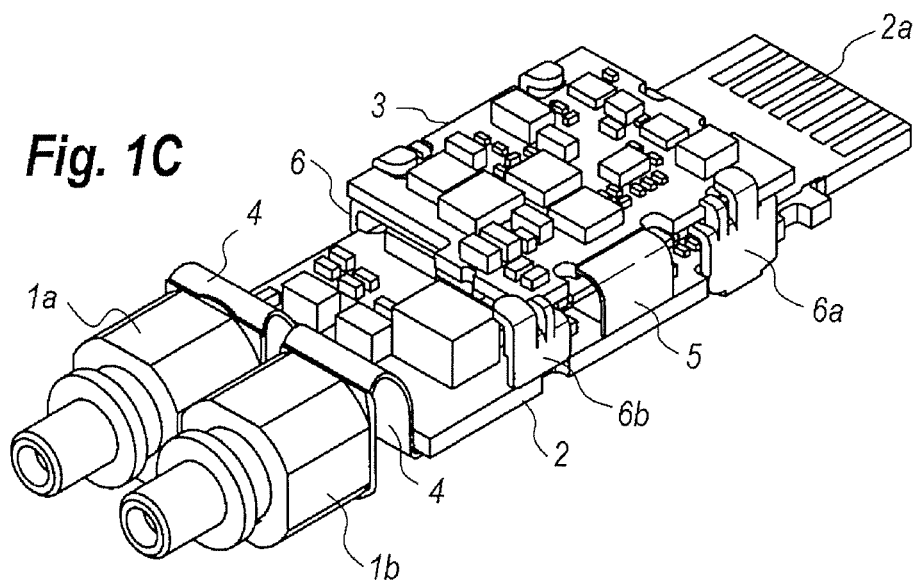
Fig. 1C

Fig. 14A
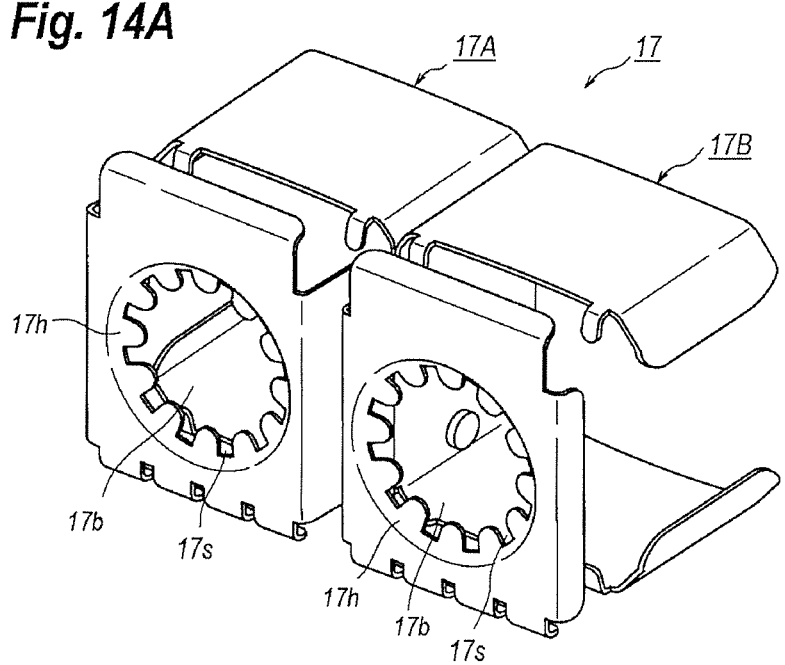
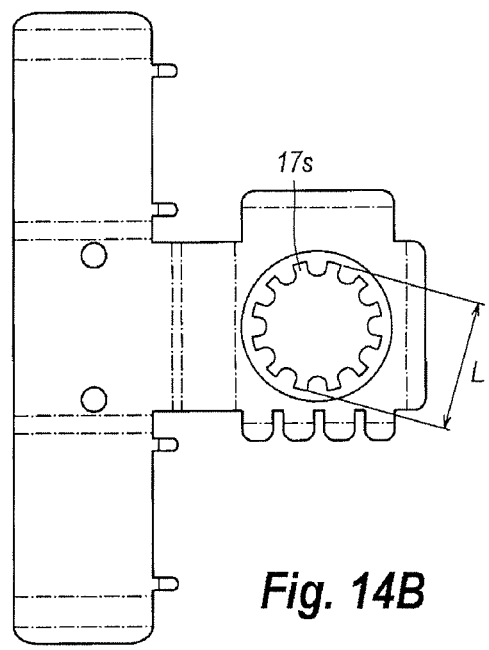
Fig. 14B

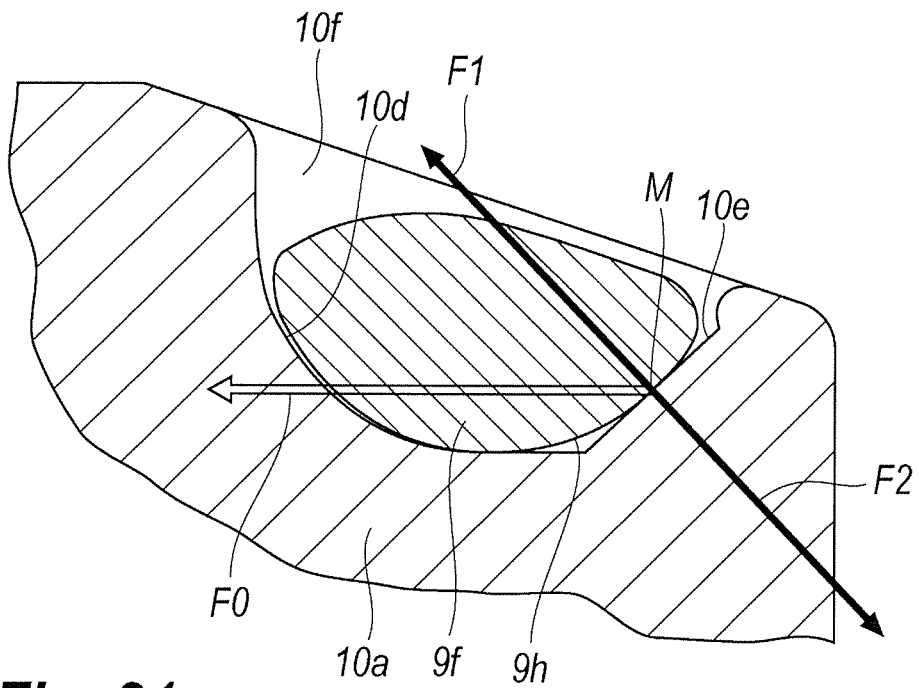
Fig. 21
Fig. 22
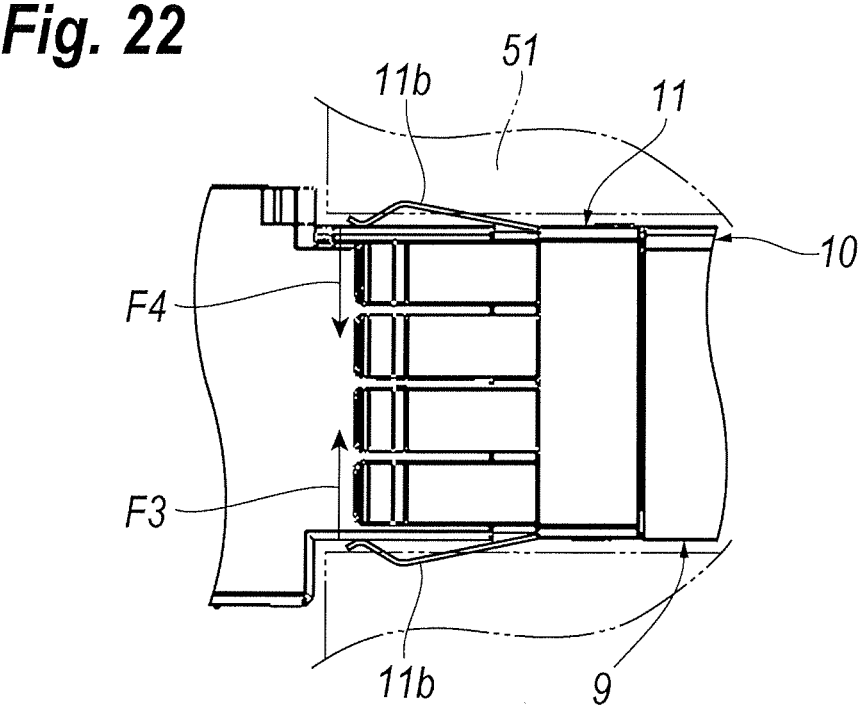

OPTICAL TRANSCEIVER

BACKGROUND OF THE INVENTION

1. Field of the Invention

The present invention relates to an optical transceiver, in particular, the invention relates to a pluggable optical transceiver.

2. Related Background Arts

An optical transceiver applicable to the optical communication system generally includes a transmitter optical subassembly (hereafter denoted as TOSA), a receiver optical subassembly (hereafter denoted as ROSA), and a circuit mounted on a circuit board to communicate with those optical subassemblies and the host system. These elements are enclosed within a housing. The pluggable optical transceiver is inserted within a cage prepared in the host system, where the cage installs an electrical connecter to receive an electrical plug mounted on the circuit board in the optical transceiver; thus, the optical transceiver may electrically communicate with the host system.

The TOSA and the ROSA mount respective optical devices, for instance, the TOSA may mount an laser diode (hereafter denoted as LD) to emit signal light, while, the ROSA may mount a photodiode (hereafter denoted as PD) to receive another signal light. These TOSA and ROSA are coupled with the circuit board through respective flexible printed circuit board (hereafter denoted as FPC). Recent requests for an optical transceiver make them faster in an operating speed and further intelligent in a function thereof. Accordingly, the circuit installed in the optical transceiver becomes further complex and larger, which becomes hard to install the circuit on a single circuit board. Some conventional optical transceivers, such as disclosed in the United States patent, U.S. Pat. No. 7,416,353, mount two circuit boards.

SUMMARY OF THE INVENTION

The present invention relates to an optical transceiver. A feature of the present optical transceiver is that the optical transceiver has two circuit boards, namely, the motherboard and the daughter board, stacked to each other as putting a holder made of insulating resin or plastics therebetween. The motherboard and the daughter board are assembled with the holder only by hooking.

The holder has a plurality of legs to hook the motherboard therewith and a plurality of hooks to hook the daughter board. The hooks extend from a primary surface of the holder to a direction opposite to the legs. The holder according to an embodiment may further provide a head to press an FPC electrically connecting an OSA with the motherboard against the motherboard. The head may have an arched end along which the FPC is extended. Thus, the FPC may be escaped from peeling the electrode thereof from the pad on the motherboard with affecting no damage to the FPC.

The second feature of the optical transceiver of the present invention is that the optical transceiver provides a shield member assembled with the OSA and having a front shield and a body shield. The front shield may fill a gap formed between the sleeve of the OSA and the optical receptacle, while, the body shield may surround the body portion of the OSA. Moreover, the front shield and the body shield are both in contact with the bottom frame and the top cover; accordingly, the EMI radiation generated in the optical transceiver may be effectively shielded.

The third feature of the optical transceiver of the present invention is that the housing of the optical transceiver may include a top cover and a bottom frame, each of which may be made of metal die-casting. The top cover of the present invention may be pivotally assembled with the bottom frame. Moreover, the top cover may have a functional surface that may cause a downward force in the top cover concurrently with an upward force in the bottom frame. Accordingly, the top cover may be tightly attached with the bottom frame to shield the inside of the optical transceiver securely.

BRIEF DESCRIPTION OF THE DRAWINGS

The invention will be described in conjunction with the accompanying drawings, in which:

FIG. 1A is a perspective drawing of the holder according to an embodiment of the present invention; FIG. 1B is a perspective view of two circuit boards before they are assembled to each other; and FIG. 1C is a perspective view of two circuit boards after they are assembled as putting the holder therebetween;

FIG. 6A is viewed from the front top, while, FIG. 6B is viewed from the rear bottom;

FIG. 8A shows the modified holder viewed from the front top, while, FIG. 8B is viewed from the rear bottom;

FIG. 12A shows shield members assembled with each other viewed from the front top, while.

FIG. 14A is a perspective view showing a modified arrangement of the shield member, and FIG. 14B is a developed drawing of the shield member shown in FIG. 14A;

FIG. 21 is a cross section taken along the longitudinal axis of the optical transceiver, where the drawing explains the mechanism to push the top cover downward but the bottom frame upward;

FIG. 22 is a side view showing the optical transceiver set within the cage prepared in the host system.

DETAILED DESCRIPTION OF PREFERRED EMBODIMENTS

Figure 2A:
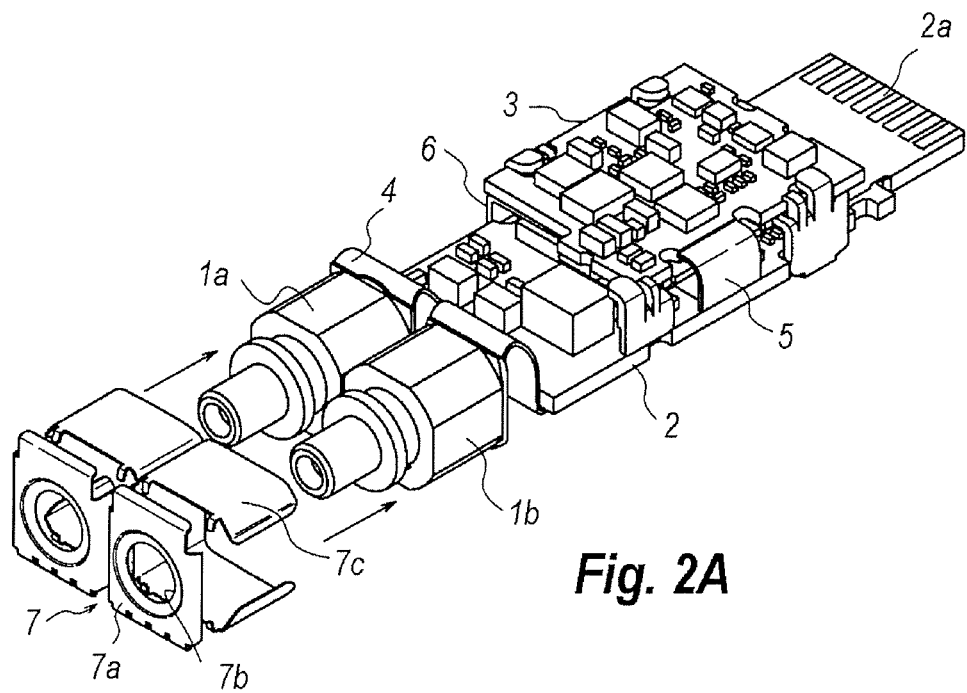
FIG. 2A shows a process to assemble the shield member with the OSA.

An optical transceiver according to an embodiment of the present invention will be described as referring to FIGS. 1A to 1C, where FIG. 1A shows a holder, FIG. 1B shows an arrangement of a motherboard 2 and a daughter board 3 connected to the motherboard 2 with a flexible printed circuit (hereafter denoted as FPC) board 4, and FIG. 1C shows an arrangement where the holder 6 is placed on the motherboard 2 and the daughter board 3 is place on the holder 6. FIGS. 1B and 1C also show the TOSA 1a and the ROSA 1b each connected to the motherboard 2 with respective FPC board 4. The description provided below assumes that the front of the optical transceiver is in the side where the OSAs are install, while, the rear corresponds to an opposite side where the electrical plug 2a is formed on the motherboard 2. Further, the top is assumed to be a side where the daughter board is put, while, the bottom is in an opposite where the motherboard is placed.

The TOSA 1a and the ROSA 1b are arranged in side-by-side position in the front side of the motherboard 2 and assembled with an optical receptacle 8, which will be described later, to constitute a sub-assembly unit. The motherboard 2 and the daughter board 3 may install circuits electrically communicating with the TOSA 1a and the ROSA 1b through respective FPC boards 4. The daughter board 3 is put above the motherboard 2 by interposing the holder 6 therebetween.

The motherboard 2 may install a primary portion of the circuit to control the optical transceiver, to communicate with the TOSA as a driver, and to communicate with the ROSA as a signal processor. The daughter board 3 may install other circuits subordinate to the primary circuits. However, the daughter board may install primary portions of the circuits and the motherboard may install other circuits. A subject which board should install which circuit is one of designing matters.

The motherboard 2 and the daughter board 3 put the holder therebetween. That is, the motherboard 2 puts the holder 6 thereon, while, the holder 6 puts the daughter board 3 thereof. The holder, details of which will be described later, may be made of electrically insulating resin. The holder 6 provides a plurality of legs, 6a and 6b, where the present embodiment provides total four legs, in the bottom surface thereof facing the motherboard, while, the top surface of the holder 6 provides a plurality of arms 6c and holding mechanism, four arms and three mechanisms in the present embodiment. Assembling the top cover 10 with the bottom frame 9, the intermediate assembly of two OSAs, 1a and 1b, with two circuit boards, 2 and 3, putting the holder 6 therebetween is installed in and fixed to the top cover and the bottom frame.

Figure 2B:
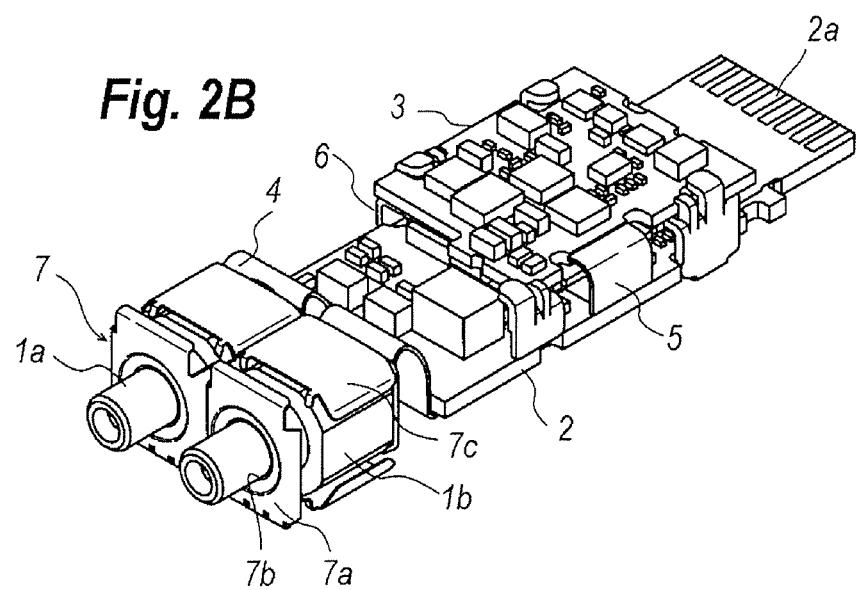
FIG. 2B shows an intermediate product that assembles the shield member with the OSA.

FIGS. 2A and 2B show a process to assemble a shield member 7 with the TOSA 1a and the ROSA 1b, where both OSAs are assembled with the motherboard 2. The shield member 7, which may be made of metal, is fit with the TOSA 1a and the ROSA 1b by inserting the cylindrical head of the OSA, 1a or 1b, into an opening 7b of the shield member 7. The OSAs, 1a and 1b, are surrounded in the body portion thereof by the shield member 7. Specifically, the shield member 7 may be divided into two parts each having respective shapes symmetrical with respect to the longitudinal axis of the optical transceiver 1 and riveted in one face thereof.

Figure 3:
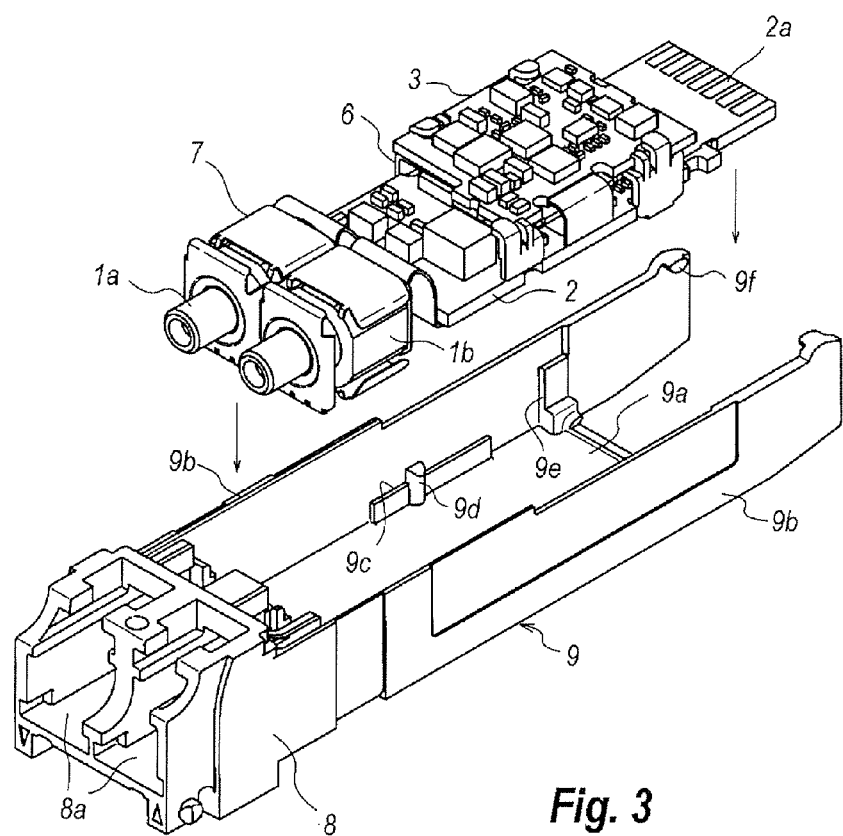
FIG. 3 shows a process, subsequent to the process shown in FIG. 2B, to set the intermediate product within the bottom frame.

FIG. 3 shows a process to assemble another intermediate assembly within the base frame 9. The base frame, which may be made of metal, provides in the front thereof an optical receptacle 8 with a pair of cavities 8a for receiving an external duplex connector therein. Inserting the front cylindrical portion of the OSAs, 1a and 1b, into respective cavities from the rear of the optical receptacle 8, the active devices in the OSA, 1a and 1b, may optically couple with the external fiber in the duplex connector.

The base frame 9, which may be also made of metal, provides a pair of sidewalls 9b and a bottom 9a. The sidewall 9b provides mechanisms, 9c and 9d, to support the motherboard 2 in an inner surface thereof. Specifically, a step 9c may support the motherboard 2 thereon, while a pillar 9d formed in a portion of the step 9c may position the longitudinal direction of the motherboard by being received with in a semicircular cut 2c formed in the side edge of the motherboard 2. The sidewall 9b may further provide a vertical step 9e that abuts against the rear end 6k of the holder 6 to define the longitudinal position of the holder 6, and a pivot 9f which becomes an axis for the rotational assembly of the top cover 10. Setting the holder 6 with two boards, 2 and 3, into the bottom frame 9, by inserting the leg, 6a1 and 6a2, between the cut 2b and the vertical step 9e, the bulge 6g pushes the motherboard frontward to abut the rear edge of the cut 2c against the pillar 9d, the intermediate assembly of two boards, 2 and 3, with the holder 6 may be automatically and rigidly positioned in the bottom frame 9.

Figure 4A:
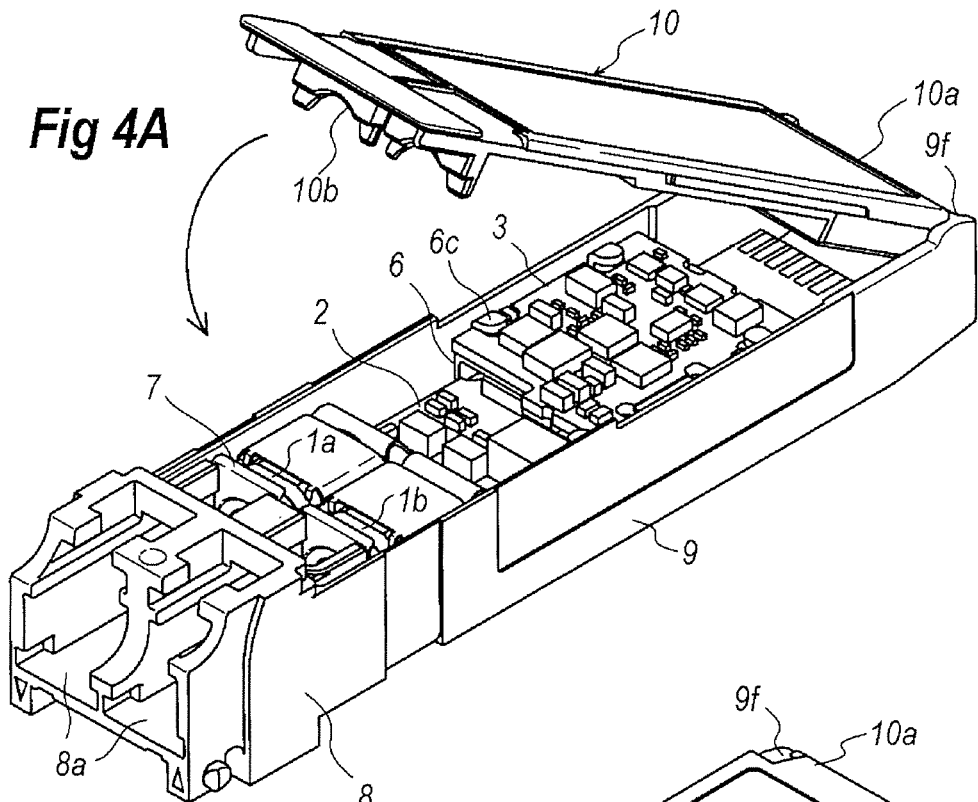
FIG. 4A shows a process to assemble the top cover with the bottom frame.
Figure 4B:
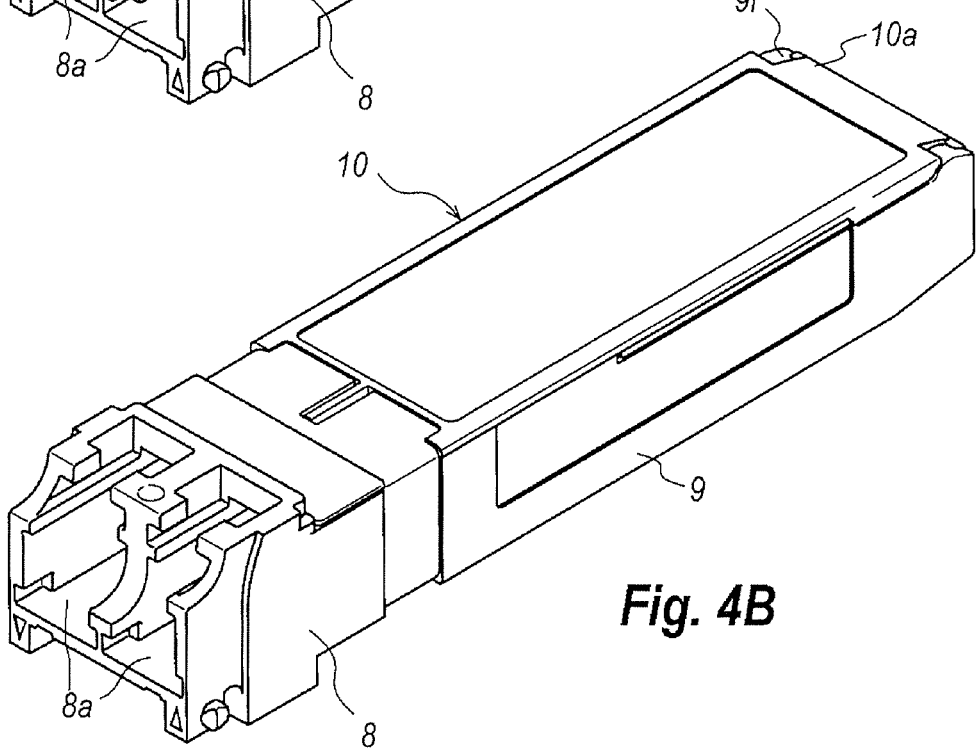
FIG. 4B shows the optical transceiver after the assembly of the top cover with the bottom frame.

FIGS. 4A and 4B show process to assembly the optical transceiver 1 after the condition shown in FIG. 3. Specifically, the top cover 10, which may be also made of metal, is put on the top of the base frame 9 such that: (1) first receiving the pivot 9f in a pocket provided in the rear 10a of the top cover 10; and (2) rotating the top cover by the pivot 9f in the pocket as the center of the rotation to latch the front end of the top cover 10 with the bottom frame 9 at the end of the optical receptacle 8. The inside of the top cover 10 provides two saddles 10b each mounting the neck portion of the cylinder head of the OSAs, 1a and 1b, when the top cover 10 is latched with the bottom frame 9. Moreover, legs 6c formed in the top surface of the holder 6 come in contact with the ceiling of the top cover 10 when the top cover 10 is assembled with the bottom frame 9, which may vertically fix the holder 6.

Figure 5A:
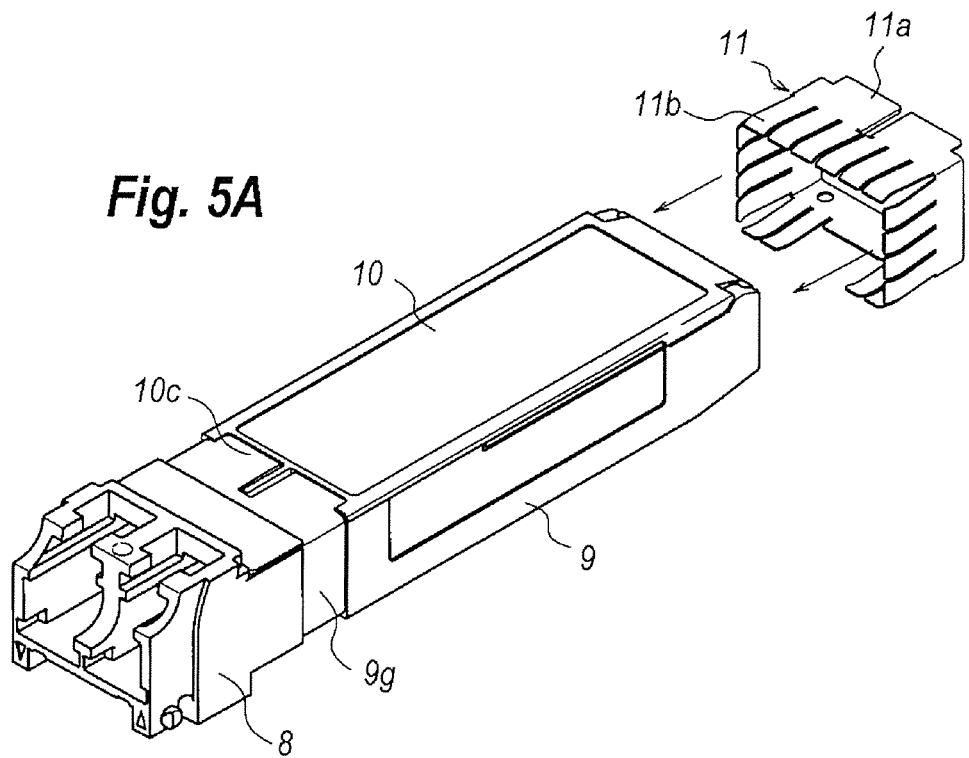
FIG. 5A shows a process to assemble the ground plate with the top cover and the bottom frame.
Figure 5B:
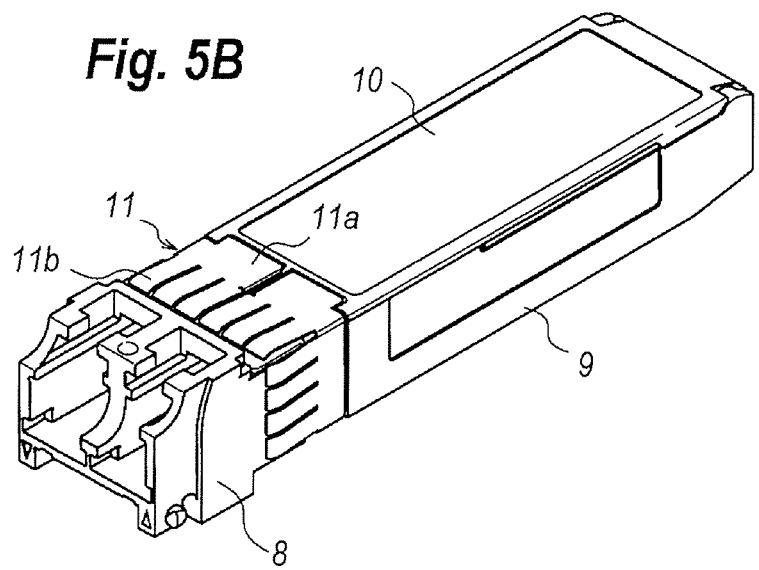
FIG. 5B shows the completed optical transceiver.

FIGS. 5A and 5B show a process subsequently carried out after the process shown in FIGS. 4A and 4B. Specifically, a ground finger 11 is fit from the rear end of the transceiver 1.

The ground finger 11 may secure the ground when the optical transceiver is set within a metal cage provided in the host system by making the fingers 11b in contact with the inner surface of the metal cage. The ground finger 11 includes a cover portion 11a that fits with the housing of the optical transceiver and a plurality of fingers 11b extending forwardly from the cover portion. The fingers 11b have an arched shape extruding outwardly to facilitate the physical contact with the metal cage. The cover portion 11a is set within a hollow 9g of the bottom frame 9 and another hollow 10c of the top cover 10.

Figure 6A:
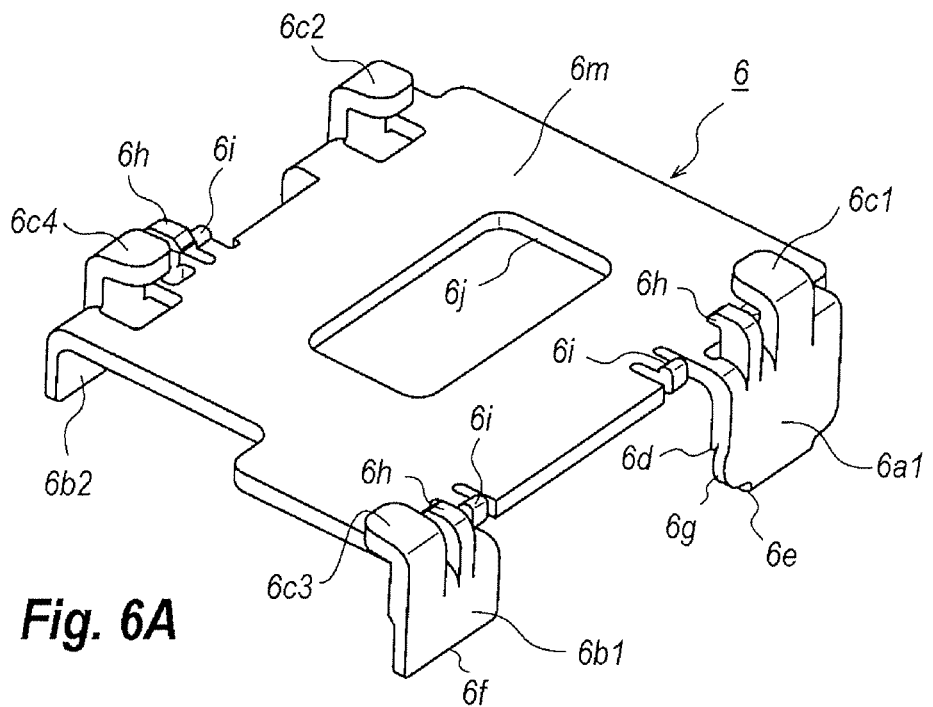
FIGS. 6A and 6B are perspective views of the holder set within the optical transceiver shown in FIG. 5B, where

Next, details of the holder 6 and some modifications thereof will be described as referring to the drawings. FIGS. 6A to 7C show details of the holder 6 and arrangements where the holder 6 is set on the motherboard 2 as mounting the daughter board 3 thereon. As shown in FIG. 6, the holder 6 may be made of electrically insulating resin or plastics formed by the molding. The holder 6 provides a plurality of legs, 6a1 and 6b2, and a plurality of arms, 6c1 to 6c4. The legs, 6a1 to 6b2, have two shapes, one of which is reflected in the legs, 6a1 and 6a2, while the latter is reflected in the other legs, 6b1 and 6b2. The legs, 6a1 to 6b2, extend downward from both lateral edges of the bottom surface 6n. While, the arms, 6c1 to 6c4, extend upward also from both lateral edges of the top surface 6m.

One type of legs, 6a1 and 6a2, has longer length compared with the other type of legs, 6b1 and 6b2. The former type of legs, 6a1 and 6a2, provides a hook 6e and a step 6d in an end portion thereof, where the hook 62 and the step 6d latch the motherboard 2 therebetween. On the other hand, the other type of legs, 6b1 and 6b2, has a shorter length; accordingly, when the holder 6 latches the motherboard 2 in a groove formed between the hook 6e and the step 6d, the tip 6f of the shorter legs, 6b1 and 6b2, abut against the top surface of the motherboard 2. The legs, 6a1 and 6a2, also provide a bulge 6g in a front side thereof and a rear edge 6k with a smooth shape The legs, 6a1 and 6a2, are set between a cut 2b provided in the edge of the motherboard 2 and the vertical step 92 of the bottom frame 9. Thus, the position of the holder 6 with respect to the motherboard 2 may be automatically determined.

Figure 6B:
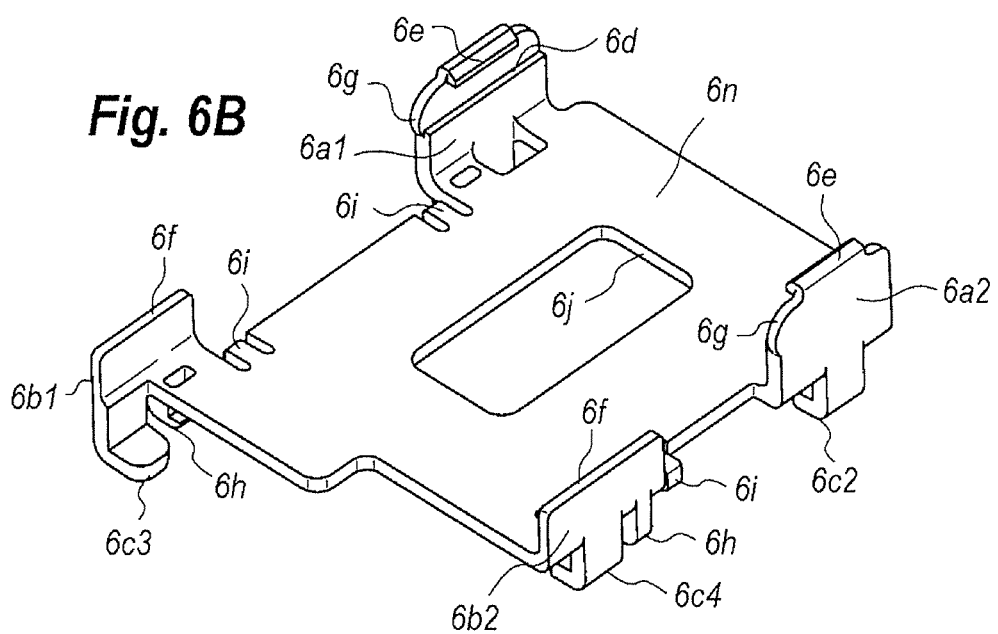

The holder 6 may also provide a plurality of mechanisms in respective positions corresponding to positions of the legs, 6a1 to 6b2 to support the daughter board 3, where the mechanism includes a pair of a hook 6h and an elastic tab 6i. Although the embodiment shown in FIGS. 6A and 6B provides three mechanisms, but the holder 6 may only have at least three mechanisms and the holder 6 may provide four or more mechanisms. Setting the daughter board 3 on the elastic tabs 6i, the tab 6i lifts the daughter board upward to press the daughter board 3 against the hook 6h. Thus, the daughter board 3 may be aligned with the holder 6.

Figure 7A:
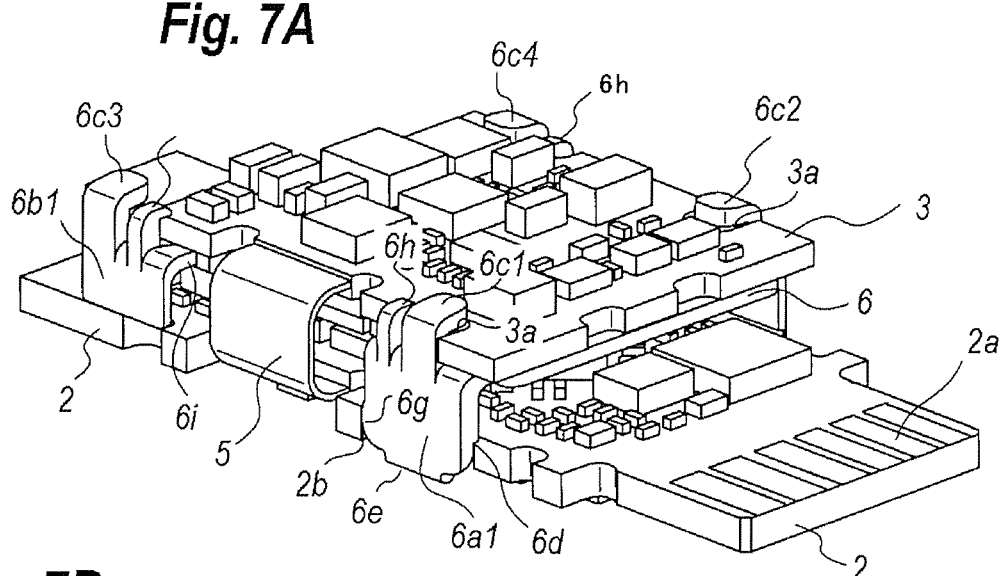
FIGS. 7A to 7C show intermediate product including the holder, the motherboard and the daughter board, where latter two boards put the holder therebetween.
Figure 7B:
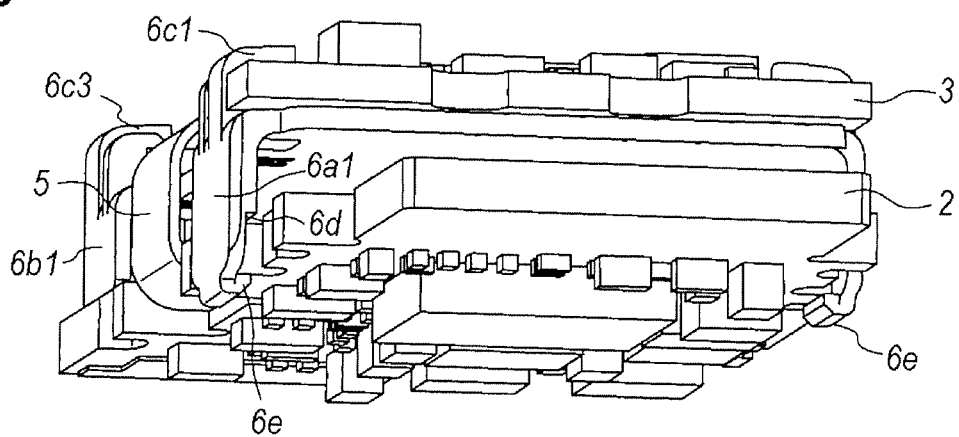
Figure 7C:
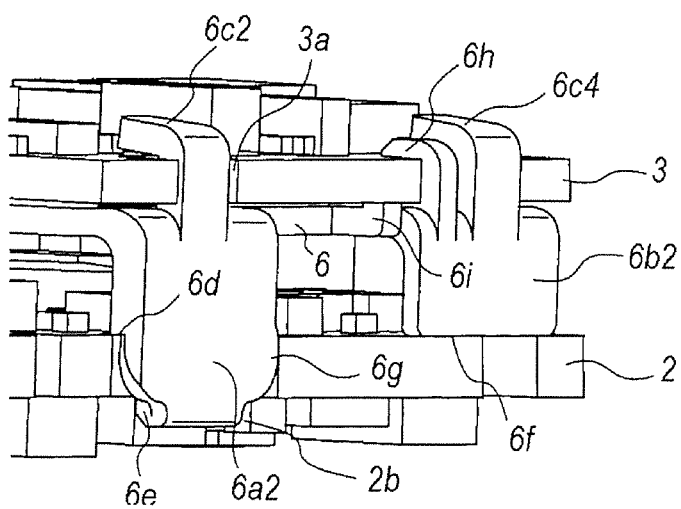

The holder 6 may further have an opening 6j in a center portion thereof. When the motherboard 2 mounts electronic components whose height exceeds a gap between the top of the motherboard 2 and the bottom surface 6n of the holder 6, the opening 6j may secure a surplus room for the components. The daughter board 3 may be electrically connected to the motherboard 2 with the FPC board 5 as shown in FIGS. 7A and 7B. FIG. 7A is a perspective view of the intermediate product where the holder is put on the motherboard 2 as one type of legs, 6b1 and 6b2, abut against the top surface of the motherboard 2, the bulge of the other type of legs, 6a1 and 6a2, is set within the side cut of the motherboard, and the hook 6e and the step 6d put the board 2 therebetween. While, the daughter board 3 is place on the holder 6 such that the elastic tab 6i pushes the daughter board 3 upward to press the board 3 against the hook 6h. Top of the arms, 6c1 to 6c4, is exposed from the daughter board 3 to be in contact with the top cover 10. The FPC board 5 extends from the side of the motherboard 2; passes between two legs, 6a1 and 6b1, and two arms, 6c1 and 6c3; and reaches the side of the daughter board 3.

In a process to assembly the holder 6 with the motherboard 2, two legs, 6a1 and 6a2, having relatively longer length may be expanded laterally to set the motherboard 2 as abutting the upper surface thereof against the step 6d of the leg, 6a1 and 6a2, to set the motherboard 2 within the groove formed between the stem 6d and the hook 6e. In this process, the tip 6f of the other legs, 6b1 and 6b2, with relatively shorter length abuts against the upper surface of the motherboard 2.

Subsequently, bending the FPC board 5 to face the bottom surface of the daughter board 3 to the upper surface of the motherboard 2, the daughter board 3 is set on the holder 6. In this process, the daughter board 3 expands the hook 6h outwardly to abut the bottom surface of the daughter board 3 against the elastic tab 6i. Because the elastic tab 6i lifts up the daughter board 3 upward but the hook 6h operates as a stopper for the daughter board 3. Thus, the daughter board 3 may be securely set on the holder 3. In this process, rear arms, 6c1 and 6c2, of the holder 6 are set within the cut 3a of the daughter board 3, which may securely fix the longitudinal position of the daughter board 3. Then, the assembly of the motherboard 2, the holder 6, and the daughter board 3, where the motherboard 2 assembles the OSAs, 1a and 1b, with respective FPC boards 4, are set within the bottom frame 9 as inserting the cylindrical head of the OSAs, 1a and 1b, into respective cavities in the optical receptacle 8. In this state, the bulge 6g of the rear legs, 6a1 and 6a2, abuts against the rear surface of the cut 2b of the motherboard 2, while, the rear surface of the rear legs, 6a1 and 6a2, are in contact with the vertical step 9e of the bottom frame 9; and the pillar 9d is set in the other cut 2c of the motherboard 2 as putting the motherboard on the side step 9c of the bottom frame 9. Thus, the intermediate assembly of the motherboard 2, the holder 6, and the daughter board 3 are securely set within the bottom frame 9. Then, the top cover 10 is assembled with the bottom frame 9. All arms, 6c1 to 6c4, in bent head thereof may be in contact with the inner surface of the top cover a 10 when the top cover 10 is set with the bottom frame 9, then, the top cover 10 may push the assembly of the daughter board 3, the holder 6, and the motherboard 2 downward.

Figure 8A:
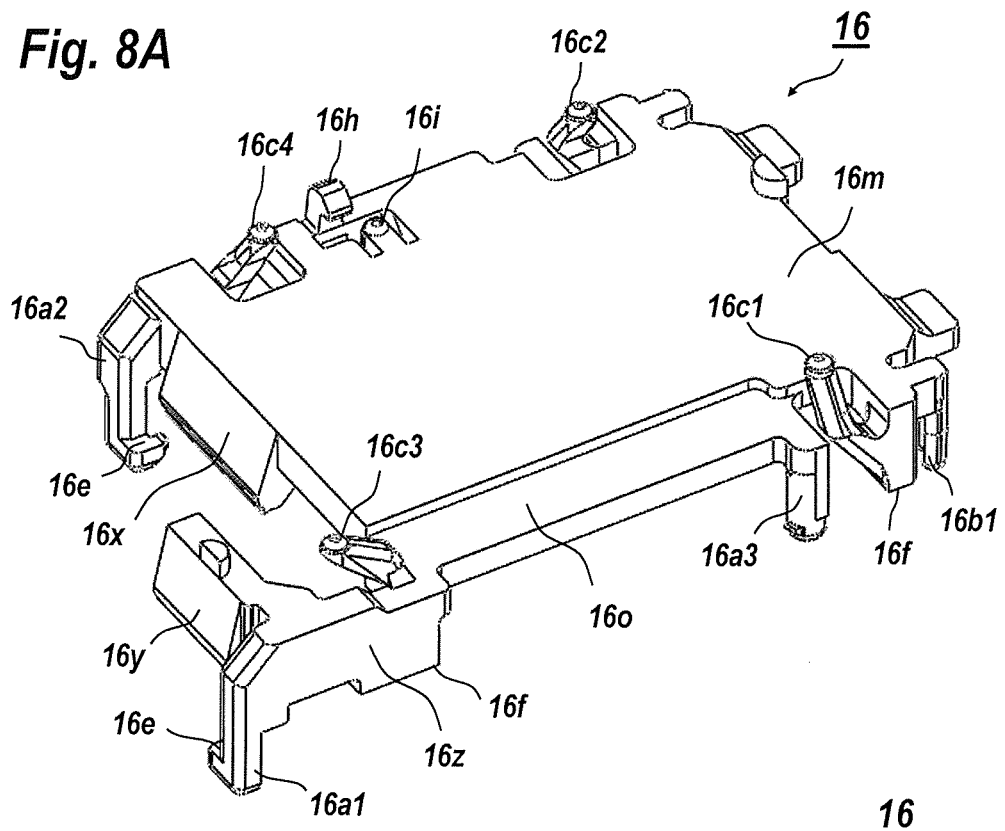
FIGS. 8A and 8B show another holder according to a modified embodiment of the invention, where
Figure 8B:
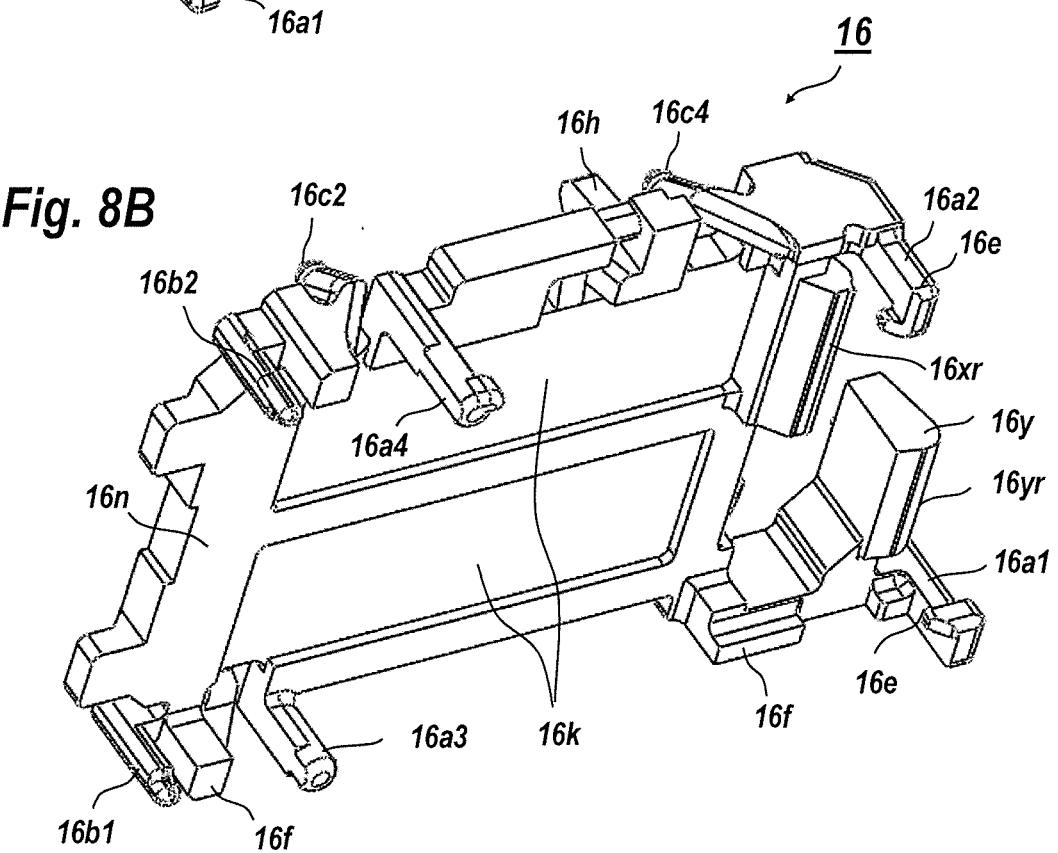

Next, a modification of the holder 6 will be described as referring to FIGS. 8A, and 8B, where FIG. 8A is a perspective drawing of the modified holder 16 viewed from the front top, while, FIG. 8B is another perspective drawing of the holder 16 viewed from the rear bottom. The holder 16 also provide a plurality of legs, 16a1 to 16a4, another type of legs, 16b1 and 16b2, and a sidewall 16z, where they extend downward from the bottom surface 16n thereof. The first group of legs, 16a1 to 16a4, has a length longer than a length of the second type of legs, 16b1 and 16b2, and the hook 16e in the top thereof. Meanwhile, the length of the second group of legs, 16b1 and 16b2, has the length substantially equal to a height of the sidewall 16z. Functions of two group of legs are same as those in the first embodiment. Moreover, the sidewall 16z has the top 16f in contact with the top surface of the motherboard 2.

The holder also provides a plurality of arms, 16c1 to 16c4, extending upward from the upper surface 16m of the holder 16. Similar to those of the first embodiment, the functions of the arms, 16c1 to 16c4, are that, when the top cover 10 is assembled with the bottom frame 9, the top of the arms, 16c1 to 16c4, is in contact with the inner surface of the top cover 10, which pushes the assembly of the daughter board 3, the holder 16, and the motherboard 2, against the bottom frame 9 to hold the assembly securely in the housing. The holder 16 of the present embodiment also has an elastic tab 16i protruding upward from the top surface 16m of the holder 16. The function of the elastic tab 16i is same as those 6i in the first embodiment.

The holder according to the second embodiment has at least two features. One of the features is that the holder 16 provides the sidewall 16z extending frontward from the side of the ROSA 1b and this sidewall 16z provides an head 16y extending inward at the top of the sidewall 16z. The head 16y has a height equal to or slightly less than the height of the sidewall 16z and a rounded tip 16yr in a top thereof. The holder 16 has the head 16y in the side of the ROSA 1b; while, the holder 16 has only a projection 16x protruding downward in the front end of the primary surface 16m. The projection 16x also provides a rounded tip 16xr in a top thereof whose height is also equal to or slightly less than the height of the sidewall 16z.

Figure 9A:
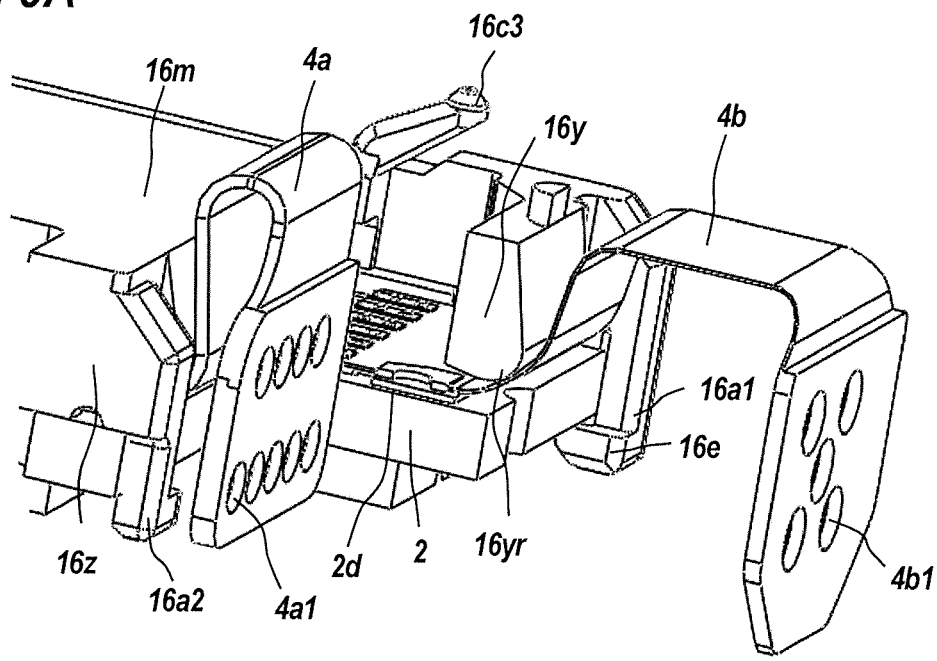
FIGS. 9A and 9B magnify a front portion of the modified holder and the motherboard, from which the FPC board is drawn out.
Figure 9B:
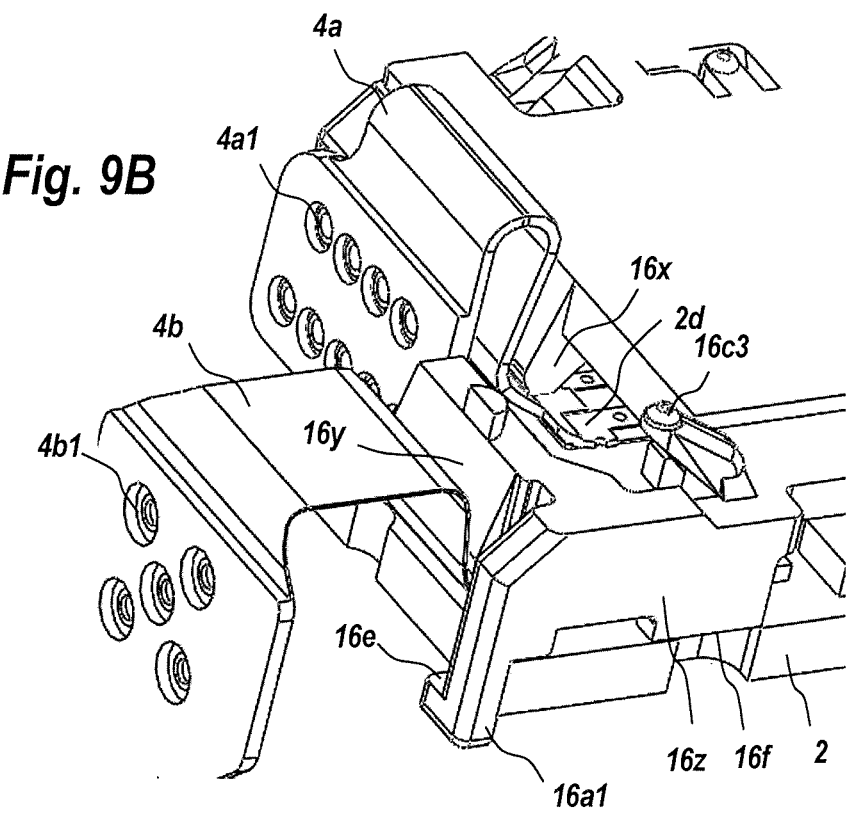

Referring to FIGS. 9A and 9B, two FPCs, 4a and 4b, connect respective OSAs, 1a and 1b, to the motherboard 2. Because the lead pins of the OSA, 1a and 1b, extend rearward; the FPC, 4a and 4b, extends upward at the side of the OSA to face the lead pins of the OSA to via holes, 4a1 and 4b1, of the OSA. The FPCs, 4a and 4b, are bent rearward and downward to form a reverse U-shape. Finally, the FPCs, 4a and 4b, are bent rearward again to connect to pads 2d on the motherboard 2. Thus, the U-shaped FPCs, 4a and 4b, are always caused with a force at the pads 2d to be peeled off. The pads 2d are necessary to widen an area thereof to oppose the peeling force to secure stable connection of the pads 2d; but it should avoid widening interconnecting patterns for high-frequency signals from a viewpoint of parasitic capacitance of the interconnecting patterns. Accordingly, the holder 16 of the present embodiment provides the projections, 16x and 16y, to press the FPCs, 4a and 4b, downward against the motherboard 2 near the pads 2d.

Figure 10:
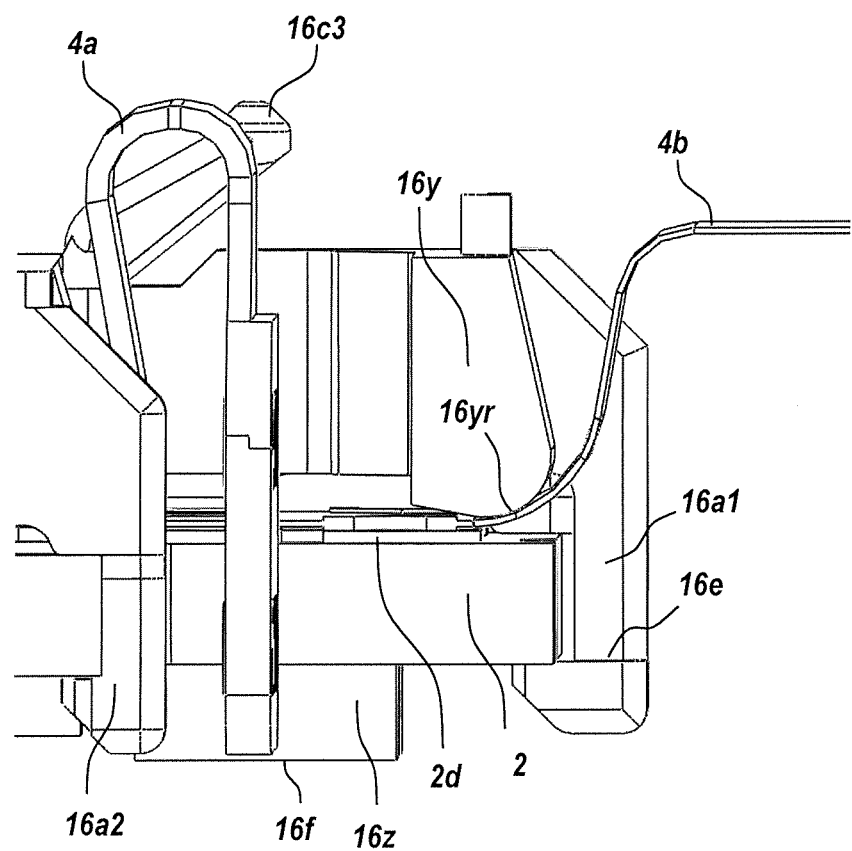
FIG. 10 is a side view of the front portion of the holder and the motherboard, where a head presses the FPC against the motherboard to prevent the FPC from peeling off from the motherboard.

Referring to FIG. 10, the projections, 16x and 16y, has the arched tip, 16xr and 16yr. Training the FPCs, 4a and 4b, along the arched tip, 16xr and 16yr, the FPCs, 4a and 4b, may be escaped from an excess force; and putting the FPCs, 4a and 4b, between the arched tip, 16xr and 16yr, and the motherboard 2, the pads 2d may be escaped from undesired force. When the TOSA 1a installs a temperature controller, which is often called as TEC, within the housing thereof to make the temperature of the LD in stable, the housing of the TOSA 1a has no choice to enlarge the size thereof. The front position of the TOSA 1a is automatically decided by the optical requirement for the optical receptacle. Accordingly, an enlarged housing of the TOSA 1a extends rearward, which approaches the rear end of the TOSA 1a close to the front end of the motherboard 2, and the FPC 4a further increases the curvature of the reverse U-Shape and the resultant peeling force applied to the pads 2d. The projections, 16x and 16y, may effectively decrease the peeling force.

The second feature of the holder 16 according to the present embodiment is that the top surface 16m thereof provides a step 16o in the side portion thereof. Similar to the first embodiment, the FPC 5 may electrically connect the motherboard 2 with the daughter board 3. The FPC 5 is drawn out from the side of the motherboard 2, folded back to the daughter board 3, and finally connected to the side of the daughter board 3. However, the curvature of the FPC 5 is forced to be small, similar to other FPCs, 4a and 4b, to cause a large force in the pads. When the daughter board 3 provides the pads connected to the FPC 5 in the top surface thereof, the stress to peel off the pads is always affected from the FPC 5.

In the arrangement of two boards, 2 and 3, and the FPC 5 according to the present embodiment, the pads to be connected to the FPC 5 are formed in the bottom surface of the daughter board 3 facing the holder 16, where the FPC 5 may be pressed the against the daughter board 3 even the FPC 5 causes the stress in the pads, and the step 16o may secure a gap to pass the FPC 5 even where the daughter board 3 is closely contact with the holder 16.

Figure 11A:
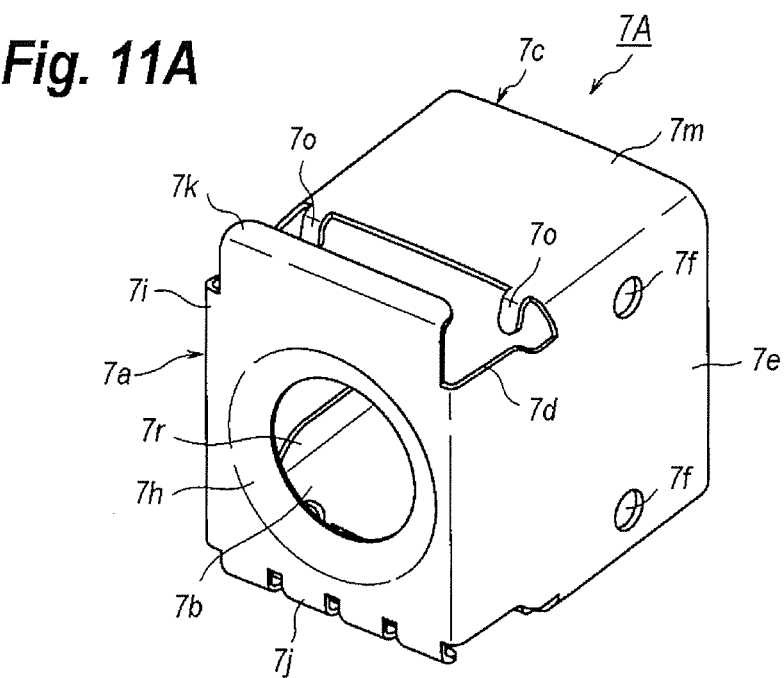
FIGS. 11A and 11B show the shield members, one of which (FIG. 11A) is for the TOSA, while, the other of which is for the ROSA, to shield an inside of the optical transceiver by being attached to the sleeve OSAs.
Figure 11B:
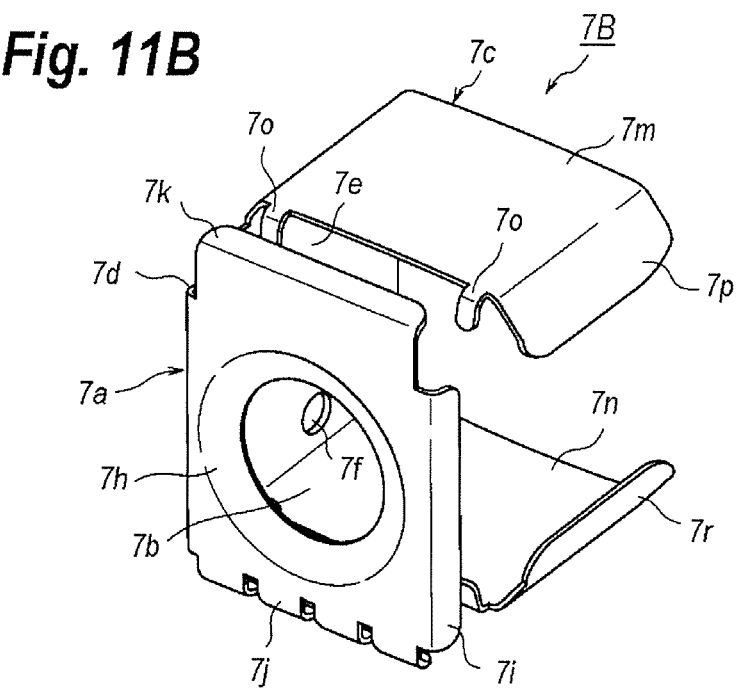
Figure 12A:
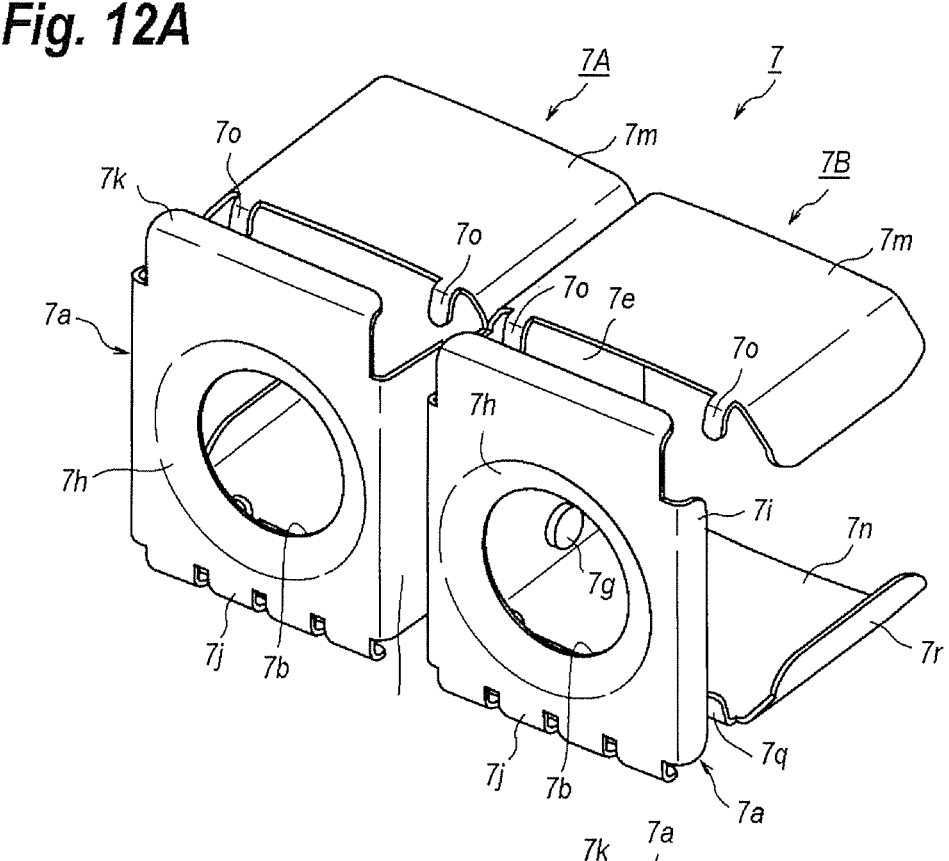
Figure 12B:
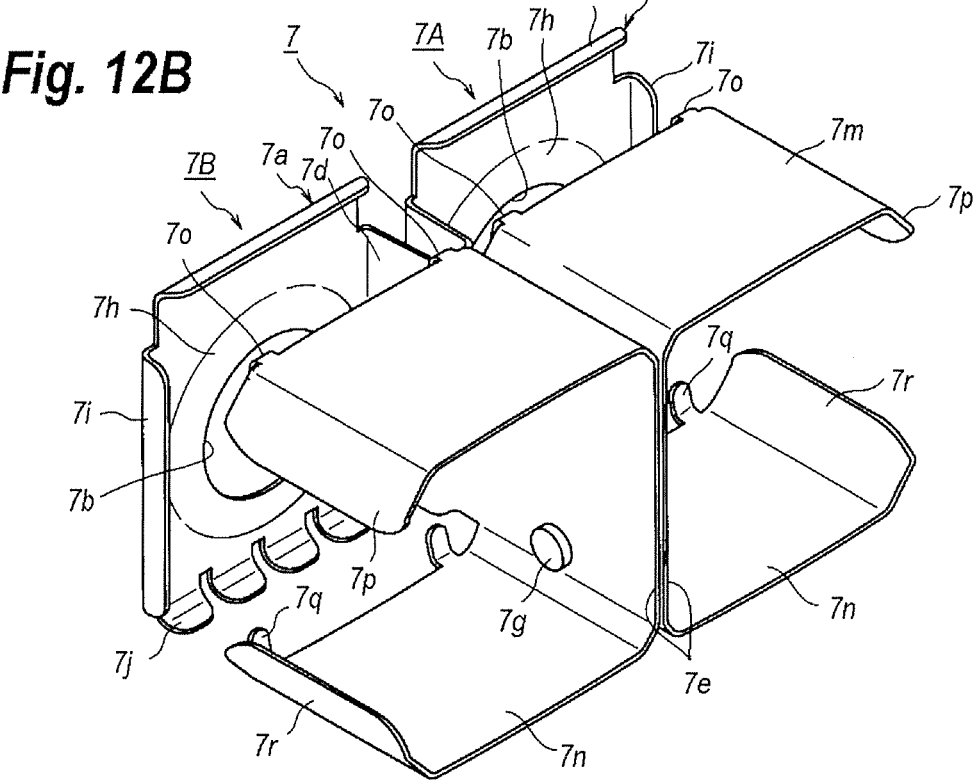
FIG. 12B shows shield members viewed from the rear top.

FIG. 11A to FIG. 12B show details of the shield member 7 according to an embodiment of the present invention, in which FIGS. 11a and 11b show the shield member 7 in the separate arrangement, while, FIG. 12A and FIG. 12B show the shield member 7 in the integrated arrangement.

As shown in FIGS. 11A and 11B, the shield member 7A for the TOSA 1a and that 7B for the ROSA, where they have the symmetrical arrangement to each other, each has the front shield 7a to cover the cavity 8a of the optical receptacle 8, the body shield 7c to cover the body of the OSAs, 1a and 1b, and the neck 7d connecting the front shield 7a to the body shield 7c. The body shield 7c has the C-shaped cross section with the side 7e, the top 7m and the bottom 7n. The side 7e has an opening 7f into which a rivet 7g is inserted to assemble two shield members, 7A and 7B.

The front shield 7a has a slope 7h to form a hollow. The bottom of the hollow has an opening 7b through which the cylindrical portion of the OSA, 1a or 1b, passes. The front shield 7a further provides a tab 7i bent in the side thereof, another tab 7k in the top, and the third tab 7j in the bottom. These tabs, 7i to 7k, are bent rearward. The first tab 7i is in contact with the sidewall 9b of the base frame 9, the second tab 7j, which is divided in pieces, is in contact with the bottom of the base frame 9, and the third tab 7k is in contact with the top cover 10. The last edge of the front shield 7a provides the neck 7d.

The body shield 7c, which is connected to the front shield 7a with the neck 7d, provides three major shields, namely the top shield 7m, the bottom shield 7n, and the side shield 7e. The top shield 7m provides the front tab 7o, and side tab 7p in an edge opposite to an edge extending to the side shield 7e. The former tab 7o is in contact with the top cover 10, while, the other tab 7p is in contact with the sidewall 9b. The bottom shield 7n provides the tab 7q in the front edge thereof and the side tab 7r in an edge opposite to the edge extending to the side shield 7e. The former tab 7q is in contact with the bottom frame 9, while, the latter tab 7r is in contact with the sidewall 9b.

Figure 13A:
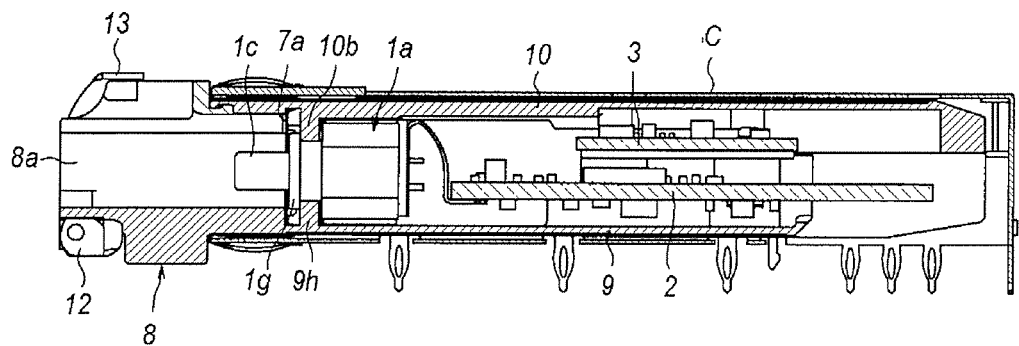
FIG. 13A is a cross section taken along the longitudinal axis of the optical transceiver, where the cross section shows how the shield member cover a gap inherently formed between the OSA and the housing of the optical transceiver, and FIG. 13B magnifies a portion where the shield member is assembled with the sleeve of the OSA.
Figure 13B:
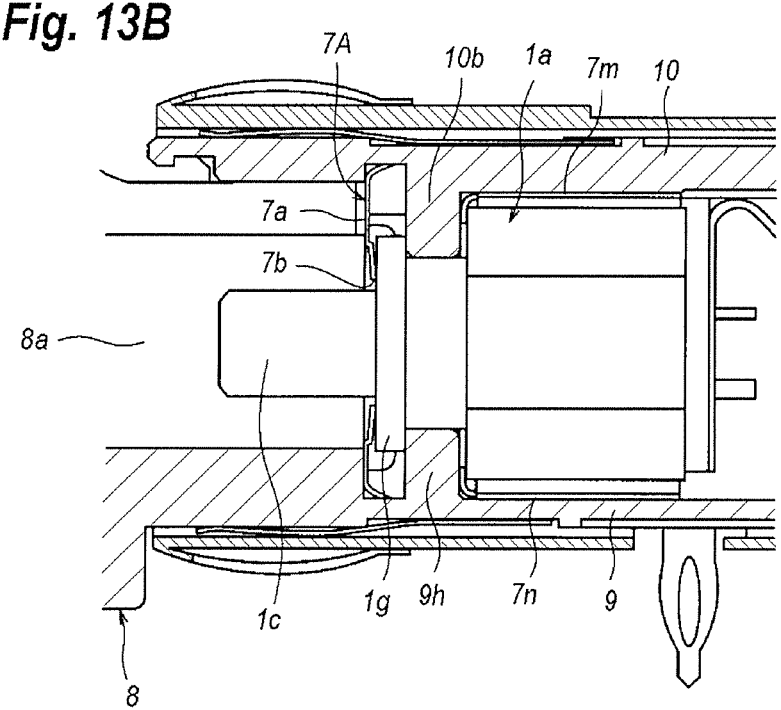

FIG. 13A is a cross section taken along the longitudinal axis of the optical transceiver, which explains the arrangement of the shield member 7 in the housing, and FIG. 13B magnifies the rear end of the optical receptacle 8, namely, the front end of the OSA, 1a or 1b. FIGS. 13A and 13B concentrate on the arrangement around the TOSA 1a, however, the arrangement same as those shown in FIGS. 13A and 13B are reflected in the arrangement of the ROSA 1b. The optical transceiver 1 is set in the metal cage C such that the ground finger 11 surrounding the outer periphery of the front end of the optical transceiver 1 comes in contact with the inside of the cage C, which may ground the bottom frame 9 and the top cover 10.

Assembling the TOSA 1a such that the sleeve 1c thereof passes through the opening 7b of the shield member 7A, the front shield 7a is set accompanied with the flange 1g of the TOSA 1a and deformed between the rear end of the optical receptacle 8 and the saddle 9h of the bottom frame 9 and another saddle 10b of the top cover 10. The deformation of the front shield 1a, specifically, the deformation of the tabs, 7i to 7k, and the slope 7h around the opening 7b, causes a force pressing the flange 1g rearward to abut against the saddles, 9h and 10b, which may position the TOSA 1a longitudinally in the housing.

Because the sleeve 1c passes the opening 7b to cover gaps occasionally formed between the outer surface of the sleeve 1c and the cavity of the optical receptacle, the EMI radiation leaked from the gap may be effectively decreased. Moreover, after the assembly of the shield member 7, the top, bottom and side shields, 7m, 7n, and 7e, respectively, surrounds the body of the TOSA 1a, and these shields, 7m, 7n, and 7e, may be securely in contact with the bottom frame 9 and the top cover 10, the TOSA 1a and the ROSA 1b in the body portion thereof may be doubly shielded.

Moreover, the shield member 7 provides the side shield 7e which is put between the TOSA 1a and the ROSA 1b, and the shield member 7, as explained above, may be securely in contact with the bottom frame 9 and the top cover 10, two OSAs, 1a and 1b, may be effectively isolated. In particular, the ROSA 1b receives an optical signal and converts this optical signal into a faint electrical signal. On the other hand, the TOSA 1a switches a large current to drive an LD in the TOSA 1a which causes a large EMI noise. The center shield 7e may effectively protect the ROSA 1b from the EMI radiation coming from the TOSA 1a.

FIG. 14A is a perspective view showing another embodiment of the shield member 17, and FIG. 14B is a developed view. The shield member 17 has an opening 17b and a slope 17h different from those, 7b and 7h, in the previous embodiment. Referring to FIG. 14A, the slope 17h of the present embodiment has a plurality of slits 17s each extending in radial. The slits 17s may effectively suppress an eddy current caused by the EMI radiation leaked from the opening 17b as generating the eddy current around the periphery of the opening 17b. Moreover, the radially formed slits may soften the elasticity inherently attributed to the slope 17h, which may facilitate the assembly of the shield member 17 in the housing. Bending the metal plate which is cut as shown in a developed figure of FIG. 14B along chained lines, the shield member 17 according to the present embodiment may be completed without using any soldering, welding and so on. The depth of slits 17s may be determined such that the maximum distance L between the bottoms of the slit 17s becomes less than a quarter wavelengths of the eleventh overtones of the fundamental transmission speed. The embodiment shown in FIG. 14B has even numbers of slits 17s with a constant pitch. However, the slits 17s with the constant pitch are preferable in odd numbers.

Figure 15A:
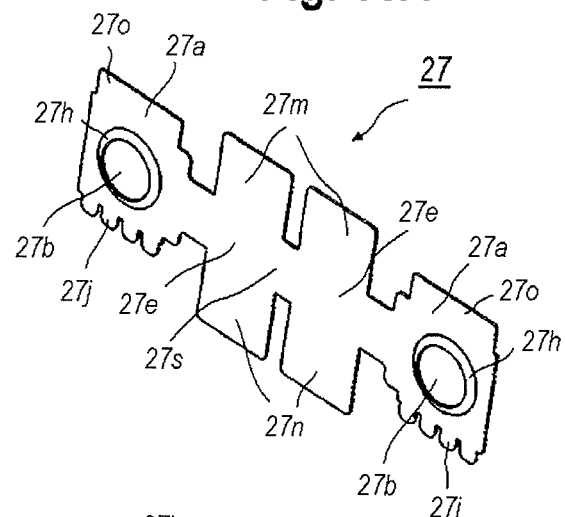
FIG. 15A is a developed drawing of the shield member according to a still another embodiment of the invention.
Figure 15B:
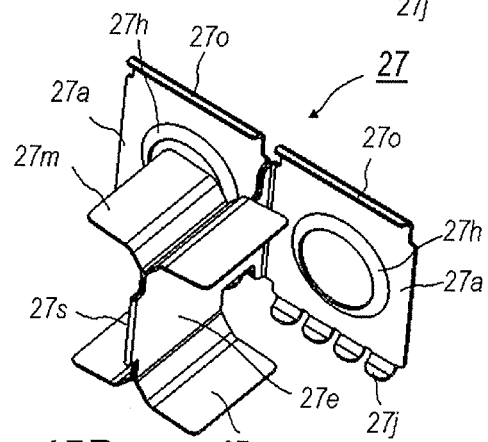
FIG. 15B is a perspective view of the shield member shown in FIG. 15A.

FIGS. 15A and 15B show still another embodiment of the shield member 27. Embodiments of the shield member afore mentioned has a separate arrangement for the TOSA 1a and the ROSA 1b, and assembled to each other by, for instance, rivet. The embodiment shown in FIGS. 15A and 15B has a metal plate common to the OSAs, 1a and 1b, connected by a bridge 27s. Bending thus cut metal plate shown in FIG. 15A as those shown in FIG. 14B, the shield member 27 with a metal plate common to the TOSA 1a and the ROSA 1b may be obtained.

Figure 16:
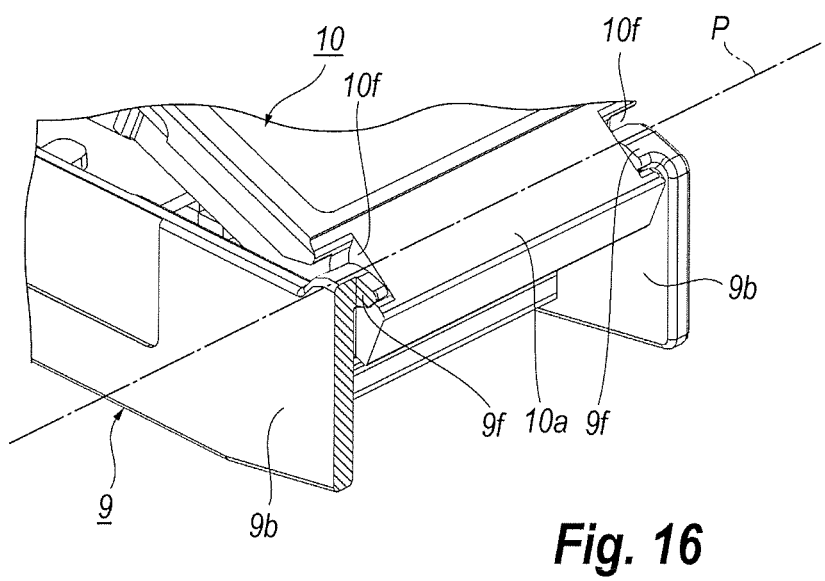
FIG. 16 shows a rear portion of the optical transceiver to explain a mechanism to assemble the top cover with the bottom frame.
Figure 17:
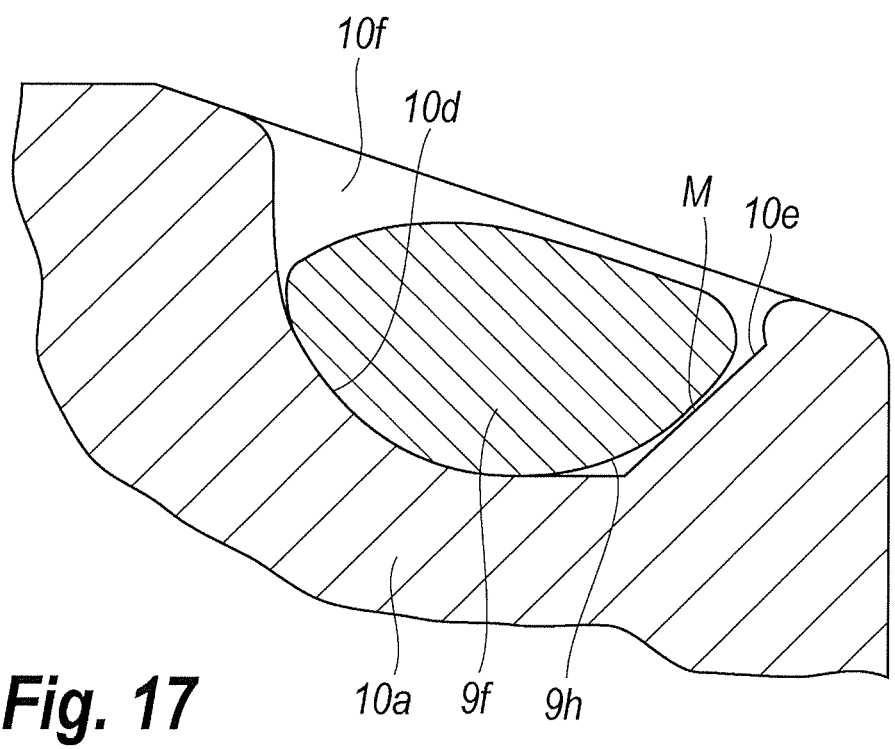
FIG. 17 is a cross section of the pivot provided in the sidewall of the bottom frame and the pocket formed in the rear end of the top cover.

Next, mechanisms to assemble the top cover 10 with the bottom 9 will be described. As shown in FIGS. 16 and 17, wherein FIG. 16 magnifies a rear portion of the optical transceiver 1, while, FIG. 17 is across section showing a mechanism to rotate the top cover 10; the rear portion of the sidewall 9b provides a pivot 9f extruding inwardly. Meanwhile, the rear portion 10a of the top cover 10 provides a pocket 10c to receive the pivot 9f of the sidewall 9b. Setting the pivot 9f within the pocket 10c, the top cover 10 may be assembled with the bottom frame 9.

Specifically, the rear end 10a of the top cover 10 is held by the pivot 9f in a state to rotate the top cover 10 freely around the axis P coinciding with the axis of the pivot 9f. Rotating the top cover 10, pulling the front end of the top cover 10 upwardly around the axis, the inside of the cavity between two sidewalls 9b may be opened. Thus, the rear end 10a of the top cover 10 and the pivot 9f of the bottom frame 9 constitute the jointing mechanism A of the transceiver 1.

The jointing mechanism will be further described. As shown in FIG. 17, the pivot 9f has an arched surface 9h whose axis coincides with the axis P of the rotation. On the other hand, the bottom of the pocket 10c in a front side thereof provides another arched surface 10d whose radius is equal to or greater than the radius of the arched surface 9h of the pivot 9f. The bottom of the pocket 10c further provides, in a rear portion thereof, a slant surface 10e. The pivot 9f may smoothly rotate within the pocket 10f as making the bottom surface 9f thereof in contact with the arched surface 10d and the slant surface 10e. Moreover, the slant surface 10e operates as a functional surface M to push the pivot 9f when the bottom frame 9 and the top cover 10 receive respective forces with directions opposite to each other. This mechanism of the functional surface M may be partly caused by the ground finger 11 attached in the front of the optical transceiver 1.

Figure 18:
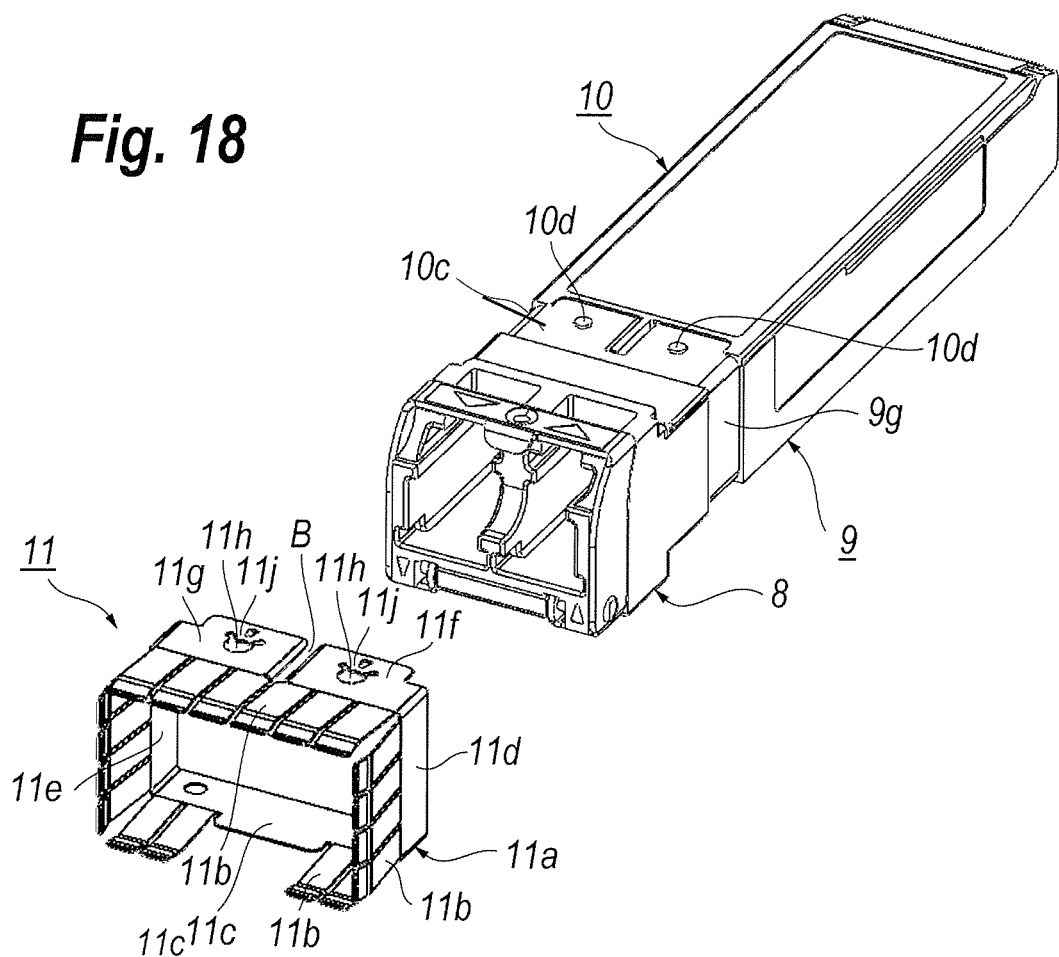
FIG. 18 is a perspective view showing a relation between the ground finger and the housing.

As shown in FIG. 18, the ground finger 11 has the cover portion 11a and the fingers 11b. The cover portion 11a includes a bottom plate 11c, side plates, 11d and 11e, and two top plates, 11f and 11g, each extending from respective side plates, 11d and 11e, to form a slit B therebetween. Each of top plates, 11f and 11g, provides a hole 11h into which the projection 10d in the hollow 10c of the top cover 10 is inserted. The ground finger 11 may be assembled with the top cover 10 and the bottom frame 9 by inserting it from the rear end of the optical transceiver 1 as expanding the slit B and setting the cover portion 11a in the hollow 10c of the top cover 10 and the hollow 9g in the bottom frame 9.

A plurality of fingers 11b extend from respective plates, 11c to 11g, of the cover portion 11a forwardly. The finger 11b has a shape protruding outwardly in a center portion thereof to secure the touch against the cage of the host system. The ground finger 11 may be made of metal, for instance, copper only by cutting and bending without soldering or welding and so on.

Figure 19:
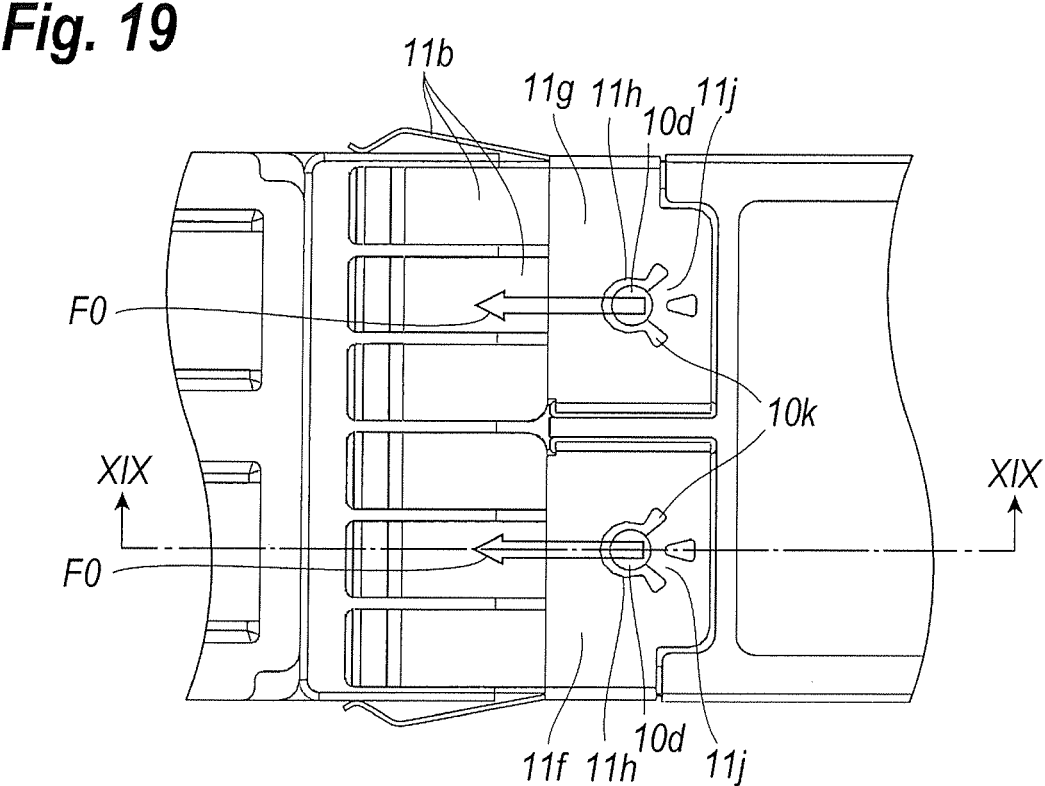
FIG. 19 is a plan view showing a mechanism to push the top cover frontward by the ground finger.
Figure 20:
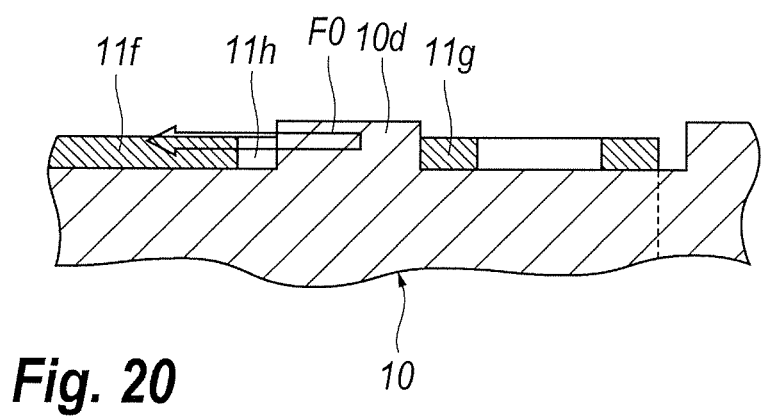
FIG. 20 is a cross section taken along the line XIX-XIX appeared in FIG. 19.

As shown in FIGS. 18 and 19, the hole 11h provides a tab 11j formed between two slits 10k. The tab 11j may cause a repulsive force against the projection 10d of the top cover 10 to push the projection 10d forwardly by being deformed elastically. While, the side plates, 11d and 11e, and the bottom plate 11c of the cover portion 11a are set within the hollow 9g of the bottom frame 9 as abutting their rear edges against the step of the hollow 9g. Thus, when the tab 11j elastically pushes the projection 10d frontward, which generates a force F0, the top cover 10 is forced frontward relative to the bottom frame 9, which means that the bottom frame 9 is forced rearward relative to the top cover 10.

The force, which is caused by the ground finger 11 and the top cover 10 to force the top cover 10 frontward while the bottom frame rearward, also affects the rotating mechanism of the pivot 9f and the pocket 10f in the rear end. As shown in FIG. 21, when the top cover 10 is pressed forwardly, the slant surface 10e of the pocket 10f abuts against the arched bottom surface 9h of the pivot 9f; which causes the force F1 to lift the pivot 9f upward by the slant surface 10e, meanwhile, another force F2 to push the slant surface 10e downward by the arched surface 9h. Thus, the slant surface 10e of the pocket 10f operates as the functional surface M to press the top cover 10 against the bottom frame 9 by the force caused by the mechanism between the ground finger 11 and the projection 10d, which may securely shield the space between the top cover 10 and the bottom frame 9 where electronic components and optical components are installed.

Because the functional surface M is a flat surface, the angle thereof against the longitudinal axis of the optical transceiver 1 may be held substantially constant even when relative positions of the pivot 9f and the pocket 10f are scattered in respective optical transceivers, which resultantly makes the forces, F1 and F2, stable to shield the inside of the optical transceiver 1.

Setting the optical transceiver 1 thus configured in the cage 51 prepared in the host system, the fingers 11b of the ground finger 11 makes in securely contact with the inner surface of the cage 51 deformed elastically between the cage 51 and the transceiver 1, as shown in FIG. 22 The fingers 11b in the bottom of the transceiver 1, which are elastically deformed, may generate the force F3 to lift the bottom frame 9 upward, while, the fingers 11b in the top of the transceiver 1 may cause another force F4 to press the top cover 10 downward. Thus, a mechanism to shield the inner space tightly even in the front portion of the optical transceiver 1.

Figure 23:
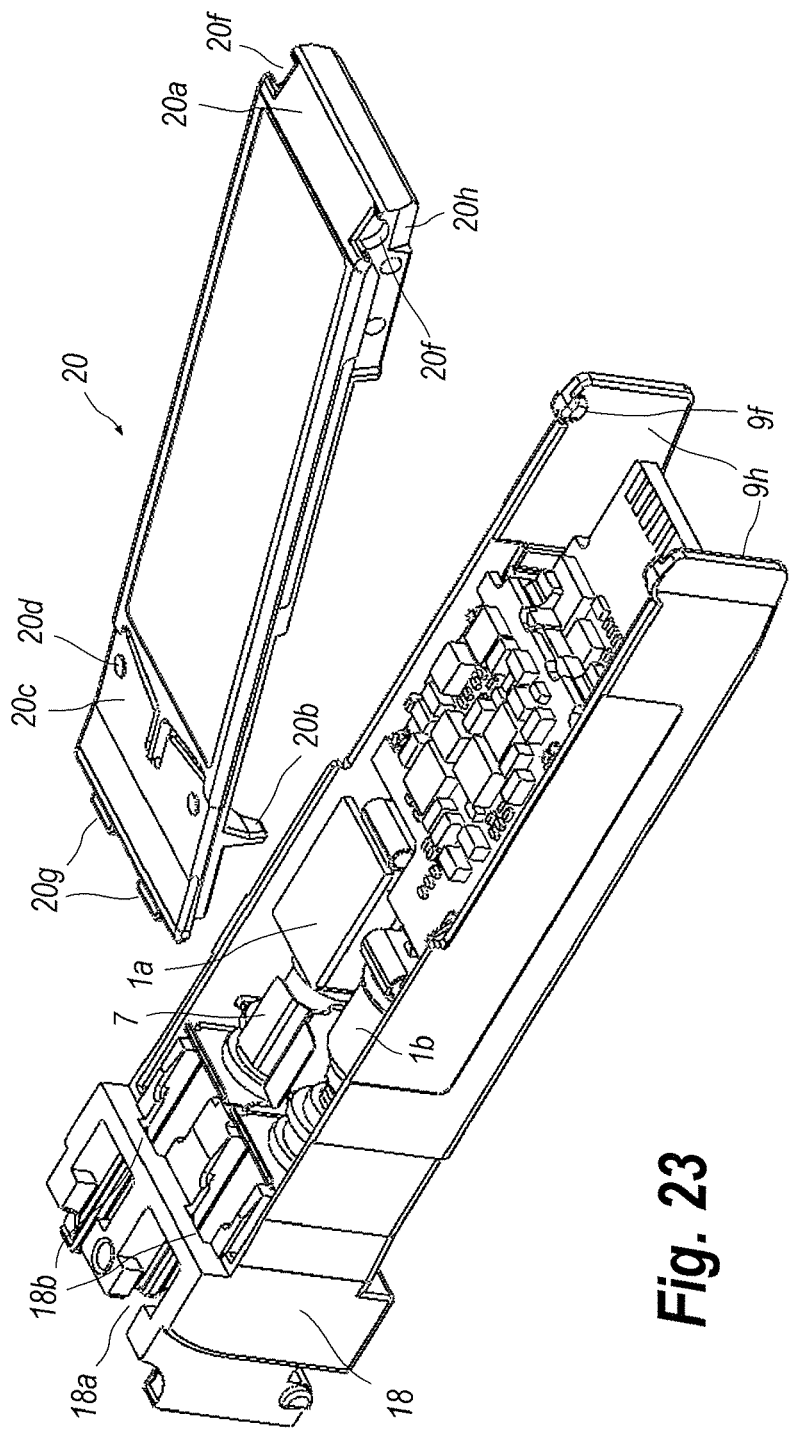
FIG. 23 is a perspective view showing another type of top cover according to an embodiment of the present invention.

FIG. 23 shows a modified top cover 20 according to another embodiment of the present invention. The top cover 20 of the present embodiment provides the pocket 20f in the rear end thereof; meanwhile, the sidewall 9b also provides the pivot 9f also in the rear portion 9h thereof corresponding to the modified top cover 20. The modified cover 20 further provides hooks 20g in the front end and the optical receptacle 18 of the present embodiment provides two cuts 18b in the rear end. The cut has a groove in the deep end, which is not clearly shown in FIG. 23. The top cover 20 of the present embodiment may be assembled with the bottom frame 9 such that the front hook 20g is first hooked with the cut 18b of the optical receptacle, then, the pivot 9f of the bottom frame 9 is fitted within the pocket 20f as expanding a distance between the side walls 9b of the bottom frame 9. In this assembly, the rear end 20a of the top cover may widen a distance between the rear walls 9h. The slope 20h formed in the rear bottom of the top cover 20 may facilitate the fitting of the top cover 20. Even in the embodiment of the top cover 2; the rear pocket 20f, in particular, the functional surface M in the pocket 20f may press the top cover 20 downward while the bottom frame 9 upward in connection with the ground finger 11, which may securely shield the inner space of the optical transceiver 1. In the present embodiment of the optical transceiver 1, the TOSA 1a has a rectangular body portion to install a thermoelectric cooler (TEC) therein.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver, comprising:
   an OSA for converting signals between an optical form and an electrical form;
   a motherboard installing a first electronic circuit thereon;
   a daughter board installing a second electronic circuit thereon;
   a holder made of insulating resin or plastics, the holder being put between the motherboard and the daughter board, the holder including a plurality of legs in a bottom surface thereof facing the motherboard, wherein at least two of legs have a step and hook, the step being in contact with a bottom surface of the mother board and the hook hooking a top surface of the mother board; and
   a housing to enclose the OSA and an assembly including the motherboard, the holder and the daughter board,
   wherein, the motherboard and the daughter board are set on the holder by hooking.

2. The optical transceiver of claim 1,
   wherein rest of legs of the holder has a length shorter than a length of the at least two legs, the rest of legs having a tip abutting against the top surface of the motherboard when the motherboard is set on the step and hooked by the hook.

3. The optical transceiver of claim 1,
   wherein the at least two legs has a bulge and a rear edge, the at least two legs being inserted into a cut of motherboard,
   wherein the bulge pushes a front edge of the cut forwardly, and the rear edge abuts against a step formed in a sidewall of the housing to position the assembly in the housing.

4. The optical transceiver of claim 1,
   wherein the holder includes a plurality of hooks and a plurality of elastic tabs in a top surface thereof facing the daughter board, the elastic tabs pushing the daughter board upward to hook the top surface of the daughter board by the hook.

5. The optical transceiver of claim 4,
   wherein the holder further includes a plurality of arms abutting against an inner surface of a top cover of the optical transceiver.

6. The optical transceiver of claim 1,
   wherein the OSA is electrically connected with the first circuit on the motherboard through a flexible printed circuit (FPC) board; and
   wherein the holder further includes a head apart from a primary portion of the holder, the head pressing the FPC against the top surface of the motherboard.

7. The optical transceiver of claim 6,
   wherein the head has an arched shape in an end thereof,
   wherein the FPC board is bent along the arched shape of the head.

8. An optical transceiver, comprising:
   an optical sub-assembly (OSA) for converting signals between an optical form and an electrical form, the OSA having a body portion and a sleeve;
   an electronic circuit communicating with the OSA, the electronic circuit generating an electro-magnetic induced noise;
   a shield member assembled with the OSA; and
   a housing to enclose the OSA, the shield member, and the electronic circuit therein,
   wherein the shield member includes a body shield to surround the body portion of the OSA and a front shield to shield the sleeve of the OSA, the body shield including a top, a side, and a bottom for surrounding the body of the OSA, the front shield providing an opening for passing sleeve of the OSA therethrough, the front shield having a slope in a periphery of the opening, the slop causing an elastic force against the OSA when the shield member is put in the housing.

9. The optical transceiver of claim 8,
   wherein the sleeve of the OSA has a flange, and the housing includes an optical receptacle and a saddle, the slope of the front shield making in contact with a front surface of the flange to push the flange rearward of the optical transceiver against the saddle of the housing.

10. The optical transceiver of claim 9,
wherein the flange of the OSA and the saddle of the housing put between the slope of the front shield and the front tab formed in the top of the body shield and the front tab formed in the bottom shield.

11. The optical transceiver of claim 8,
wherein the top and the bottom of the shield member each has a front tab and a side tab being in contact with the housing.

12. The optical transceiver of claim 11,
wherein the housing includes an optical receptacle and a saddle, the front tab of the top of the body shield and the front tab of the bottom of the body shield being in contact with a rear surface of the saddle, and the side tab of the top of the body shield and the side tab of the bottom of the body shield being in contact with the housing.

13. The optical transceiver of claim 8,
wherein the slope has a plurality of slits extending radially.

14. The optical transceiver of claim 13,
wherein the slope has an odd number of slits.

15. The optical transceiver of claim 13,
wherein the slits facing to each other has a distance between the bottoms thereof greater than a quarter wavelength of the eleventh overtones of the fundamental transmission speed of the optical transceiver.

16. The optical transceiver of claim 8,
further comprising:
another OSA for converting signal between the optical form and the electrical form, the another OSA having a body portion and a sleeve, and
another shield member assembled with the another OSA,
wherein the shield member and the another shield member are tightly assembled.

17. The optical transceiver of claim 16,
wherein the shield member and the another shield member are assembled with a rivet.

18. The optical transceiver of claim 16,
wherein the shield member and the another shield member are integrally formed.

* * * * *